(12) United States Patent
Shao et al.

(10) Patent No.: US 12,457,122 B2
(45) Date of Patent: Oct. 28, 2025

(54) NODE SELECTION METHOD AND APPARATUS, FIRST NODE, STORAGE MEDIUM, AND PROGRAM PRODUCT

(71) Applicant: Tencent Technology (Shenzhen) Company Limited, Shenzhen (CN)

(72) Inventors: Zhuguang Shao, Shenzhen (CN); Li Li, Shenzhen (CN); Jianjun Zhang, Shenzhen (CN); Bing Shao, Shenzhen (CN); Bengbeng Su, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 188 days.

(21) Appl. No.: 18/388,501

(22) Filed: Nov. 9, 2023

(65) Prior Publication Data
US 2024/0179018 A1 May 30, 2024

Related U.S. Application Data

(63) Continuation of application No. PCT/CN2023/112944, filed on Aug. 14, 2023.

(30) Foreign Application Priority Data

Nov. 30, 2022 (CN) .......................... 202211530053.5

(51) Int. Cl.
*H04L 9/00* (2022.01)
*H04L 9/32* (2006.01)

(52) U.S. Cl.
CPC .............. *H04L 9/50* (2022.05); *H04L 9/3239* (2013.01)

(58) Field of Classification Search
CPC ............................... H04L 9/50; H04L 9/3239
See application file for complete search history.

(56) References Cited

U.S. PATENT DOCUMENTS

2018/0198818 A1* 7/2018 Andrews ................. H04L 67/02
2020/0145222 A1* 5/2020 Gao ....................... H04L 9/3239
(Continued)

FOREIGN PATENT DOCUMENTS

| CN | 110049029 A | 7/2019 |
| CN | 111523890 A | 8/2020 |

(Continued)

OTHER PUBLICATIONS

Tencent Technology, ISR, PCT/CN2023/112944, Nov. 14, 2023, 2 pgs.

*Primary Examiner* — Dhairya A Patel
(74) *Attorney, Agent, or Firm* — Morgan, Lewis & Bockius LLP

(57) ABSTRACT

Embodiments of this application disclose a node selection method performed by a first node in a blockchain. In the embodiments of this application, nodes in a blockchain are grouped in an order of attribute weights of the nodes, to obtain a plurality of node groups. A node group whose attribute weight meets a preset condition is selected from the plurality of node groups, to obtain a target node group, and a preset quantity of candidate consensus nodes are selected from the target node group. A non-candidate consensus node in the target node group is stored into an initial node group. The initial node group is used as a new target node group, and the operation of selecting a candidate consensus node from the target node group is performed. Candidate consensus nodes are broadcast to one or more second nodes in the blockchain for verification.

20 Claims, 16 Drawing Sheets

(56) References Cited

U.S. PATENT DOCUMENTS

| | | | | |
|---|---|---|---|---|
| 2020/0162261 A1* | 5/2020 | Iyer | ............... | H04L 9/3239 |
| 2021/0297239 A1* | 9/2021 | Oh | ............... | H04L 9/0825 |
| 2022/0012812 A1* | 1/2022 | Roll | ............... | G06Q 10/10 |
| 2022/0158836 A1* | 5/2022 | Li | ............... | G06Q 50/18 |

FOREIGN PATENT DOCUMENTS

| | | |
|---|---|---|
| CN | 113448694 A | 9/2021 |
| CN | 114372588 A | 4/2022 |
| CN | 115374216 A | 11/2022 |

\* cited by examiner

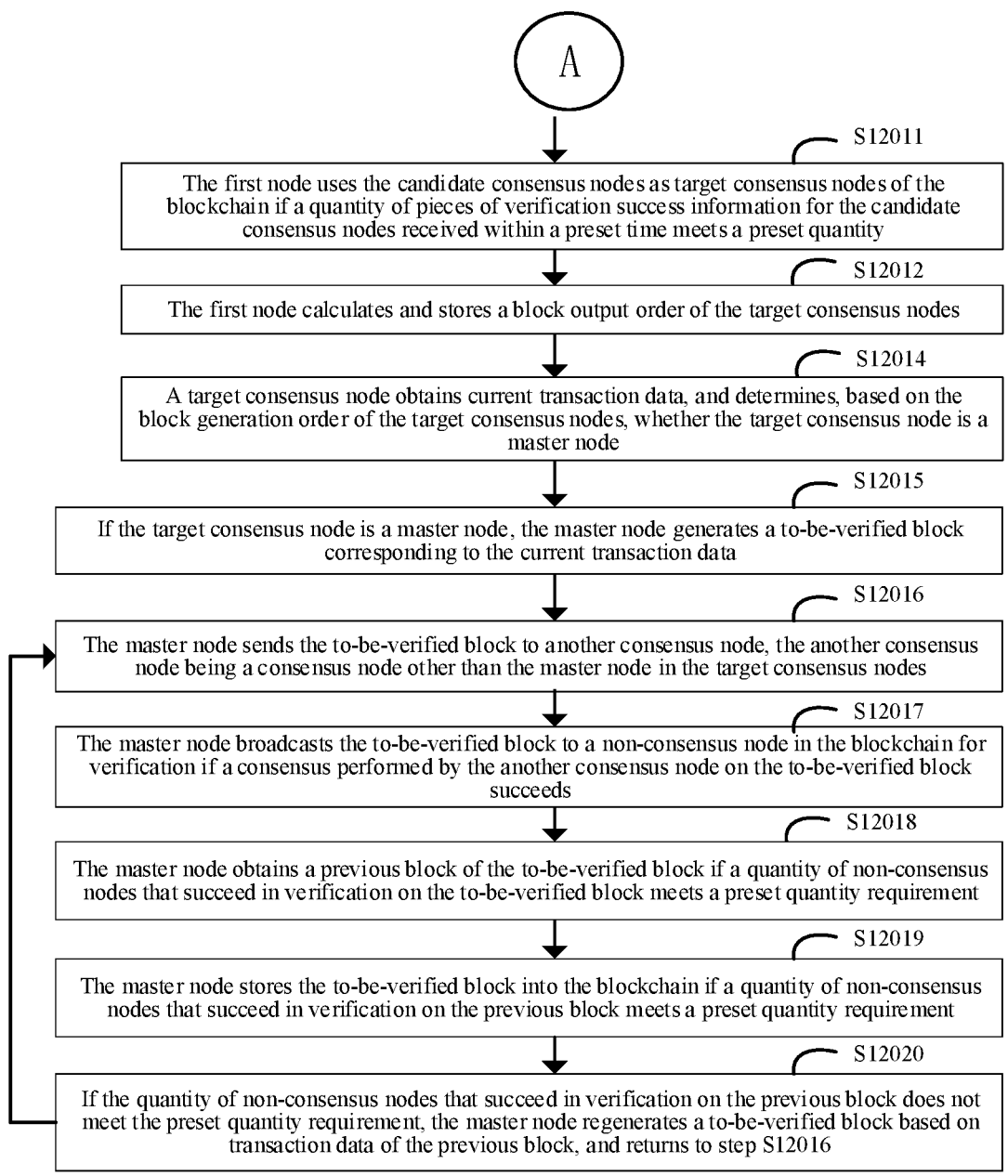
FIG. 12 – Cont'd

NODE SELECTION METHOD AND APPARATUS, FIRST NODE, STORAGE MEDIUM, AND PROGRAM PRODUCT

CROSS-REFERENCE TO RELATED APPLICATIONS

This application is a continuation application of PCT Patent Application No. PCT/CN2023/112944, entitled "NODE SELECTION METHOD AND APPARATUS, FIRST NODE, STORAGE MEDIUM, AND PROGRAM PRODUCT" filed on Aug. 14, 2023, which is based on and claims priority to Chinese Patent Application No. 202211530053.5, entitled "NODE SELECTION METHOD AND APPARATUS, FIRST NODE, STORAGE MEDIUM, AND PROGRAM PRODUCT" filed on Nov. 30, 2022, and claims priority to the Chinese Patent Application, all of which is incorporated by reference in its entirety.

FIELD OF THE TECHNOLOGY

This application relates to the field of blockchain technologies, and specifically to a node selection method and apparatus, a first node, a storage medium, and a program product.

BACKGROUND OF THE DISCLOSURE

A blockchain refers to a chain including blocks. Each block stores information. The blocks are connected into the chain in an order of respective generation time, and the chain is stored on all nodes in the blockchain.

For a purpose of decentralization, a consensus mechanism is adopted in the blockchain. The consensus mechanism includes a proof-of-work mechanism, a proof-of-stake mechanism, a delegated proof-of-stake (DPoS) mechanism, and the like. In the DPOS mechanism, a consensus node needs to be selected for block packaging and block verification. However, at present, in a current consensus node selection method, a blockchain network has poor stability.

SUMMARY

Embodiments of this application provide a node selection method and apparatus, a first node, a storage medium, and a program product, to improve stability of a blockchain network.

An embodiment of this application provides a node selection method, including:
  obtaining attribute weights corresponding to nodes in a blockchain, and grouping the nodes in an order of the attribute weights, to obtain a plurality of node groups;
  selecting a node group whose attribute weight meets a preset condition from the plurality of node groups, to obtain a target node group, and selecting a preset quantity of candidate consensus nodes from the target node group;
  storing a non-candidate consensus node in the target node group into an initial node group, the initial node group being a group other than the target node group in the plurality of node groups and matching the target node group;
  using the initial node group as a target node group, and returning to the operation of selecting a candidate consensus node from the target node group, until all of the plurality of node groups are screened;
  broadcasting candidate consensus nodes to a second node in the nodes for verification; and
  using the candidate consensus nodes as target consensus nodes of the blockchain when verification success information for the candidate consensus nodes from the second node is received within a preset time period.

Correspondingly, an embodiment of this application provides a node selection apparatus, including:
  an obtaining module, configured to obtain attribute weights corresponding to nodes in a blockchain, and group the nodes in an order of the attribute weights, to obtain a plurality of node groups;
  a screening module, configured to select a node group whose attribute weight meets a preset condition from the plurality of node groups, to obtain a target node group, and select a preset quantity of candidate consensus nodes from the target node group;
  a storage module, configured to store a non-candidate consensus node in the target node group into an initial node group, the initial node group being a group other than the target node group in the plurality of node groups and matching the target node group;
  a return module, configured to use the initial node group as a target node group, and return to the operation of selecting a candidate consensus node from the target node group, until all of the plurality of node groups are screened;
  a verification module, configured to broadcast candidate consensus nodes to a second node in the nodes for verification; and
  a use module, configured to use the candidate consensus nodes as target consensus nodes of the blockchain when verification success information for the candidate consensus nodes from the second node is received within a preset time period.

In the foregoing solution, the obtaining module is specifically configured to:
  sort the nodes in an order of the attribute weights, to obtain a sorted queue; and
  divide the sorted queue into a plurality of node groups.

In the foregoing solution, the storage module is specifically configured to:
  select, from candidate node groups, a candidate node group that is adjacent to the target node group and whose attribute weight is less than that of the target node group, to obtain an initial node group matching the target node group, the candidate node group being a node group other than the target node group in the plurality of node groups: and
  store the non-candidate consensus node in the target node group into the initial node group.

In the foregoing solution, the node group includes a first preset quantity of nodes. Correspondingly, the screening module is specifically configured to:
  determine, based on the first preset quantity and the preset quantity, a random number corresponding to the target node group; and
  select a preset quantity of candidate consensus nodes from the target node group based on the random number.

In the foregoing solution, the screening module is specifically configured to:
  use the preset quantity as a target quantity of random numbers corresponding to the target node group; and
  generate, within the first preset quantity, a target quantity of random numbers corresponding to the target node group.

In the foregoing solution, the screening module is specifically configured to:
use the random number as a node sequence number in the target node group; and
use a node corresponding to the node sequence number as a candidate consensus node corresponding to the target node group.

In the foregoing solution, the verification module is specifically configured to:
calculate a Merkle root of the candidate consensus nodes; and
broadcast the Merkle root to the second node in the nodes for verification.

In the foregoing solution, the obtaining module is specifically configured to:
obtain a plurality of pieces of attribute information corresponding to each node in the blockchain; and
determine, based on information weights corresponding to the attribute information, an attribute weight corresponding to the node.

In the foregoing solution, the obtaining module is specifically configured to:
obtain the information weights corresponding to the attribute information, and obtain an adjustment coefficient corresponding to the information weights;
adjust the information weights based on the adjustment coefficient, to obtain adjusted information weights; and
determine, based on the adjusted information weights, the attribute weight corresponding to the node.

In the foregoing solution, the node selection apparatus further includes:
a block storage module, configured to:
obtain a target block, and perform a consensus on the target block by using the target consensus nodes; and
store the target block into the blockchain when the consensus on the target block succeeds.

In the foregoing solution, the block storage module is specifically configured to:
broadcast the target block to a non-consensus node in the blockchain for verification when the consensus on the target block succeeds; and
store the target block into the blockchain when a quantity of non-consensus nodes that succeed in verification on the target block meets a preset quantity requirement.

In addition, an embodiment of this application further provides a first node, including a processor and a memory, the memory storing a computer program, and the processor being configured to run the computer program in the memory, to implement the node selection method according to the embodiments of this application.

In addition, an embodiment of this application further provides a computer-readable storage medium, the computer-readable storage medium storing a computer program, and the computer program being configured for loading by a processor, to perform the node selection method according to the embodiments of this application.

In addition, an embodiment of this application further provides a computer program product, including a computer program, the computer program, when executed by a computer, implementing the node selection method according to the embodiments of this application.

In the embodiments of this application, the target node group whose attribute weight meets the preset condition may be, for example, a node group with a larger attribute weight, and the initial node group is a group other than the target node group in the plurality of node groups and matching the target node group. Therefore, when the non-candidate consensus node in the target node group is stored into the initial node group to re-participate in screening, a quantity of screening times of a node with a larger attribute weight in the plurality of nodes can be increased, thereby increasing a probability that the node with the larger attribute weight in the plurality of nodes is selected as a candidate consensus node.

A candidate consensus node selected from the target node group may be a node with a larger attribute weight in the target node group, or may be a node with a smaller attribute weight in the target node group. A candidate consensus node selected from the initial node group may be a node with a larger attribute weight in the initial node group, or may be a node with a smaller attribute weight in the initial node group. Therefore, candidate consensus nodes obtained when the screening is completed may be nodes with larger attribute weights in the plurality of nodes, or may be nodes with smaller attribute weights in the plurality of nodes. In this way, a node with a larger attribute weight can be provided with a higher probability of being selected, and a node with a smaller attribute weight can be provided with a chance to be selected, thereby improving stability of a blockchain network.

BRIEF DESCRIPTION OF THE DRAWINGS

To describe technical solutions in embodiments of this application more clearly, the following briefly describes accompanying drawings required for describing the embodiments. Apparently, the accompanying drawings in the following description show merely some embodiments of this application, and a person skilled in the art may still derive other drawings from these accompanying drawings without creative efforts.

DESCRIPTION OF EMBODIMENTS

Figure 1A:
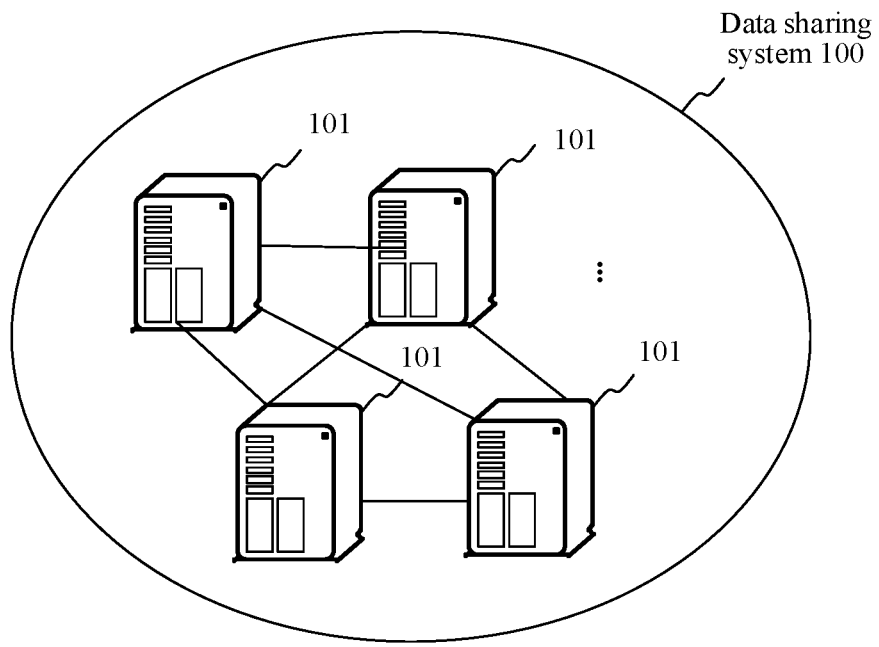
FIG. 1A is a schematic diagram of a data sharing system according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts are to fall within the protection scope of this application.

In the following description, the term "some embodiments" describes subsets of all possible embodiments, but it may be understood that "some embodiments" may be the same subset or different subsets of all the possible embodiments, and can be combined with each other without conflict.

Unless otherwise defined, meanings of all technical and scientific terms used in this specification are the same as those usually understood by a person skilled in the art to which this application belongs. The terms used in this specification are merely for the purpose of describing the embodiments of this application, but are not intended to limit this application.

The following clearly and completely describes the technical solutions in the embodiments of this application with reference to the accompanying drawings in the embodiments of this application. Apparently, the described embodiments are merely some but not all of the embodiments of this application. All other embodiments obtained by a person skilled in the art based on the embodiments of this application without creative efforts are to fall within the protection scope of this application.

The embodiments of this application provide a node selection method and apparatus, a first node, a storage medium, and a program product. The storage medium may be a computer storage medium, and the program product may be a computer program product. The node selection apparatus may be integrated into the first node, and the first node may be a server, or may be a device such as a terminal.

The server may be an independent physical server, or may be a server cluster including a plurality of physical servers or a distributed system, or may be a cloud server that provides basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform.

The terminal may be, but is not limited to, a smartphone, a tablet computer, a notebook computer, a desktop computer, a smart speaker, a smart watch, and the like. The terminal and the server may be directly or indirectly connected in a wired or wireless communication manner, which is not limited herein in the embodiments of this application.

In addition, "a plurality of" in the embodiments of this application means two or more than two. The terms "first", "second", and the like in the embodiments of this application are merely used for a distinguishing purpose, but is not to be interpreted as indicating or implying relative importance.

Refer to a data sharing system shown in FIG. 1A. The data sharing system 100 is a system for data sharing between nodes. The data sharing system may include a plurality of nodes 101, and the plurality of nodes 101 may be clients in the data sharing system. When working normally, each node 101 may receive input information, and maintain shared data in the data sharing system based on the received input information. To ensure information exchange in the data sharing system, an information connection may exist between nodes in the data sharing system, and information may be transmitted between the nodes through the information connection. For example, when any node in the data sharing system receives input information, another node in the data sharing system obtains the input information based on a consensus algorithm, and stores the input information as data in the shared data, so that data stored on all the nodes in the data sharing system is consistent.

Each node in the data sharing system has a node identifier corresponding to the node, and each node in the data sharing system may store a node identifier of another node in the data sharing system, so that a generated block is subsequently broadcast to the another node in the data sharing system based on the node identifier of the another node. Each node may maintain a node identifier list shown in the following table, and correspondingly store a node name and a node identifier into the node identifier list. The node identifier may be an Internet Protocol (IP) address or any other type of information that can be used to identify the node. Table 1 merely use the IP address as an example for description.

| Node name | Node identifier |
|---|---|
| Node 1 | 117.114.151.174 |
| Node 2 | 117.116.189.145 |
| . . . | . . . |
| Node N | x.x.x.x |

Figure 1B:
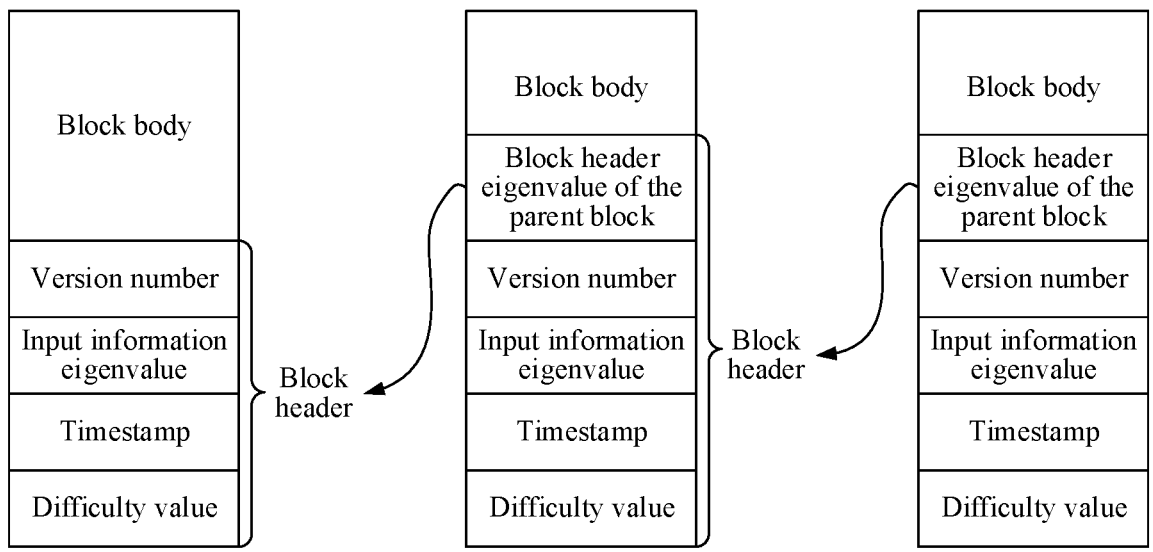
FIG. 1B is a schematic diagram of a blockchain according to an embodiment of this application.

Each node in the data sharing system stores the same blockchain. The blockchain includes a plurality of blocks. Referring to FIG. 1B, a blockchain includes a plurality of blocks, a genesis block includes a block header and a block body, the block header stores an input information eigenvalue, a version number, a timestamp, and a difficulty value, and the block body stores input information. A next block to the genesis block uses the genesis block as a parent block, and the next block also includes a block header and a block body. The block header stores an input information eigenvalue of the current block, the block header eigenvalue of the parent block, a version number, a timestamp, and a difficulty value. By analogy, block data stored in each block in the blockchain is associated with in block data stored in a parent block, thereby ensuring security of the input information in the block.

Figure 1C:
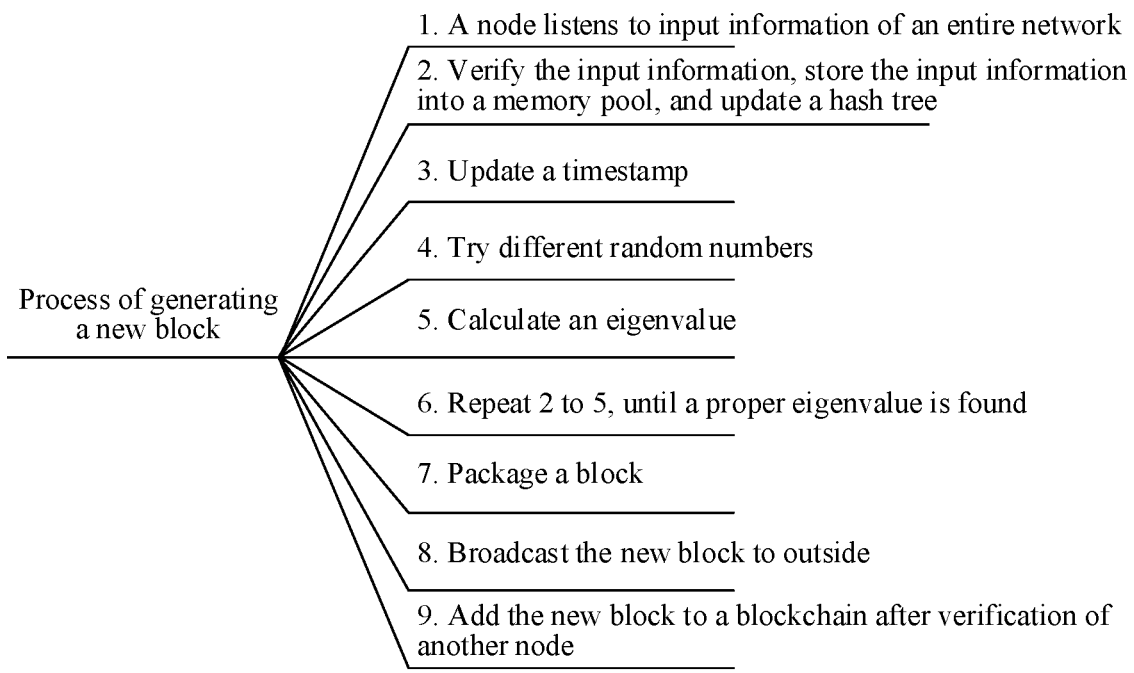
FIG. 1C is a schematic diagram of a block generation process according to an embodiment of this application.

When each block in the blockchain is generated, referring to FIG. 1C, when a node on which the blockchain is located receives input information, the input information is checked. After the check is completed, the input information is stored into a memory pool, and a hash tree of the node that is used for recording input information is updated. Then, a timestamp is updated to a time at which the input information is received, and different random numbers are tried to calculate an eigenvalue a plurality of times, so that a calculated eigenvalue may meet the following formula:

$$SHA256(SHA256(version+prev\_hash+merkle\_root+ntime+nbits+x))<TARGET$$

SHA256 represents an eigenvalue algorithm used for eigenvalue calculation; version represents protocol version information of a related block in the blockchain; prev_hash represents a block header eigenvalue of a parent block of a current block; Merkle_root represents an input information eigenvalue: ntime represents the update time to which the timestamp is updated: nbits represents current difficulty, which is a fixed value within a period of time, and is redetermined beyond the fixed period of time: x represents a random number: and TARGET represents an eigenvalue threshold, and the eigenvalue threshold may be determined based on nbits.

In this way, when a random number meeting the foregoing formula is calculated, information may be stored correspondingly, to generate a block header and a block body, thereby obtaining the current block. Subsequently, the node on which the blockchain is located sends, based on a node identifier of another node in a data sharing system in which the node is located, the new generated block to the another node in the data sharing system. The another node checks the new generated block, and after the check is completed, adds the new generated block to a blockchain stored on the another node.

Details are described below in detail. A description order of the following embodiments is not intended to limit an order of the embodiments.

In the embodiments of this application, description is provided from a perspective of a node selection apparatus. To facilitate description of the node selection method of this application, in the following detailed description, the node selection apparatus is integrated into the first node. In other words, the detailed description is provided by using the first node as an execution entity.

Figure 2:
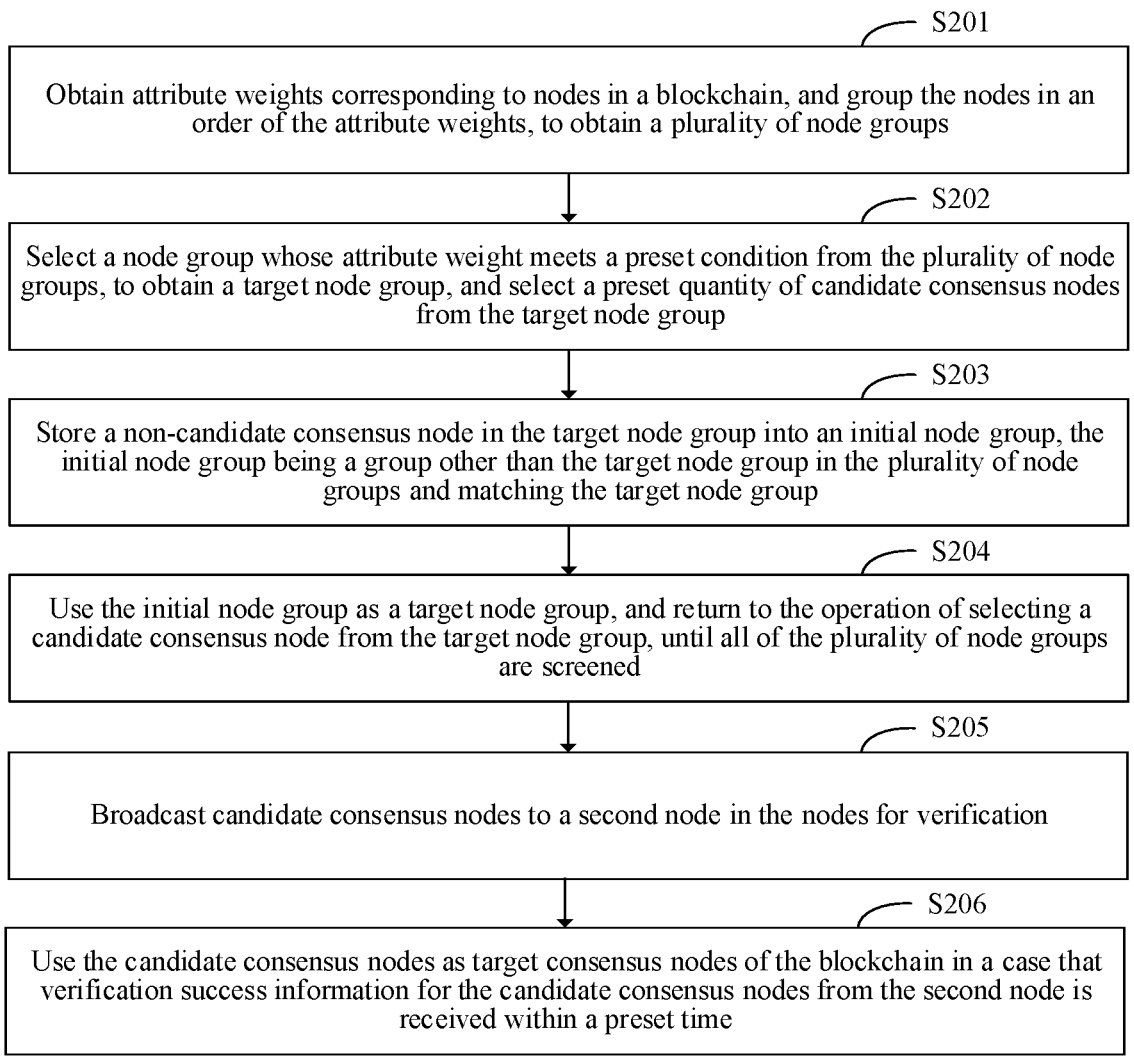
FIG. 2 is a schematic flowchart of a node selection method according to an embodiment of this application.

FIG. 2 is a schematic flowchart of a node selection method according to an embodiment of this application. The node selection method may include the following steps:

S201. Obtain attribute weights corresponding to nodes in a blockchain, and group the nodes in an order of the attribute weights, to obtain a plurality of node groups.

The first node may be any one of the nodes, that is, this embodiment of this application may be executed by any node in a blockchain.

The attribute weight represents contribution of the node in the blockchain, and the contribution may be attribute information of the node.

In some embodiments, the attribute information of the node may include pledged assets of the node or a quantity of votes obtained by the node. However, if the attribute weight of the node is determined based on the pledged assets or the quantity of votes of the node, a user corresponding to the node needs to first invest assets to participate in consensus, which reduces a participation degree of the user corresponding to the node. In addition, if the attribute weight of the node is determined based only on the pledged assets without considering another factor, scale distribution and coverage of an entire blockchain network are lacking, which is not conducive to stability of the entire blockchain network.

Figure 3:
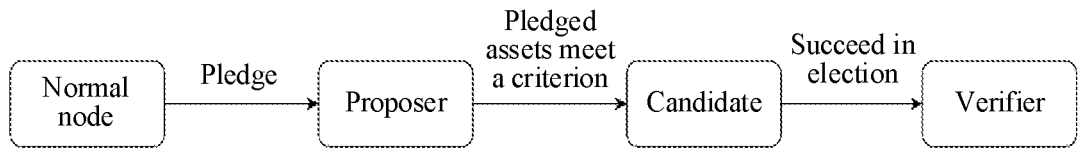
FIG. 3 is a schematic diagram of generating a consensus node according to an embodiment of this application.

For example, as shown in FIG. 3, a node of a blockchain becomes a proposer by pledging assets. If the assets pledged by the node meet a criterion, the node may become a candidate to participate in election. If succeeding in the election, the node becomes a verifier, that is, a consensus node.

Figure 4:
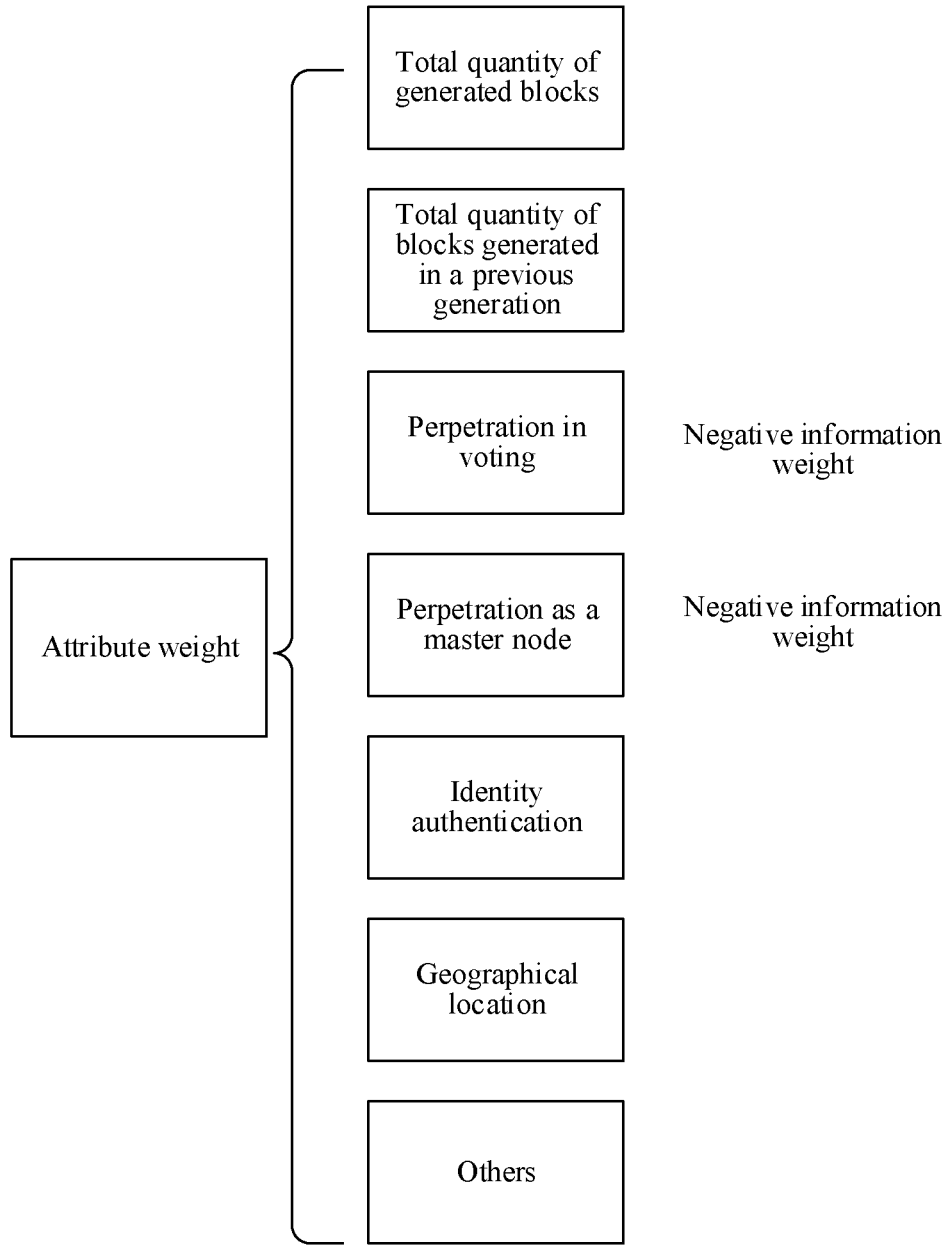
FIG. 4 is a schematic diagram of attribute information according to an embodiment of this application.

Therefore, in some other embodiments, as shown in FIG. 4, the attribute information of the node may include at least one of a total quantity of generated blocks, a total quantity of blocks generated in a previous generation (the generation refers to a period within which a role change actually takes effect), perpetration in voting (for a block of the same height, each node is allowed to vote affirmatively only once, that is, cannot vote affirmatively for a plurality of blocks of the same height, and if a node performs such an operation, it indicates that the node performs perpetration in voting), perpetration as a master node (the master node is a consensus node that generates a block), identity authentication, and a geographical location, so that when the attribute weight of the node is determined based on the attribute information of the node, the attribute weight of the node does not need to be determined based on the pledged assets or the quantity of votes of the node. In addition, when the attribute weight of the node is determined based on a plurality of pieces of attribute information of the node, the attribute weight of the node may be considered from a plurality of angles, so that when a consensus node is selected based on attribute weights, a probability that a perpetrator node is selected as a consensus node can be reduced, thereby reducing a probability of a consensus node error in a consensus process, and improving stability of the blockchain network.

The stability of the blockchain network means that the probability of the consensus node error in the consensus process is within a fault tolerance range, and the blockchain network can still run normally.

When the nodes include a plurality of pieces of attribute information, the obtaining attribute weights corresponding to nodes in a blockchain includes: obtaining a plurality of pieces of attribute information corresponding to each node in the blockchain: and determining, based on information weights corresponding to the attribute information, an attribute weight corresponding to the node.

In this embodiment of this application, the attribute weight corresponding to the node is determined by using the information weights corresponding to the plurality of pieces of attribute information, so that a plurality of factors are fully considered, thereby further improving stability of the entire blockchain network.

The first node may directly add the information weights corresponding to the attribute information, to obtain the attribute weight corresponding to the node. Alternatively, the first node may obtain an adjustment coefficient corresponding to each information weight, adjust the information weight based on the adjustment coefficient, to obtain an adjusted information weight, and finally add adjusted information weights, to obtain the attribute weight corresponding to each node.

In the foregoing solution, in each process of selecting a consensus node, each piece of attribute information may correspond to the same information weight, or each piece of attribute information may correspond to different information weights in different processes of selecting a consensus node. When the attribute information corresponds to different information weights in different processes of selecting a consensus node, the information weights may be determined based on behavior information of the node with the attribute information in the blockchain network.

For example, the attribute information may be perpetration in voting, an information weight corresponding to the perpetration in voting may be a negative weight, and a node n1 performs perpetration in voting a plurality of times in the previous generation. In this case, in a current node selection process, the information weight corresponding to the perpetration in voting may be increased at a specified percentage (for example, 5%).

After obtaining the attribute weights of the nodes, the first node may group the nodes in an order of the attribute weights, to obtain a plurality of node groups.

The first node may obtain a plurality of preset weight ranges, and then store, into the same node group, nodes corresponding to attribute weights belonging to the same preset weight range, so that nodes with larger attribute weights are stored into the same node group.

Alternatively, the first node may sort the nodes in an order of the attribute weights, to obtain a sorted queue, and then divide the sorted queue into a plurality of node groups. The sorting may be sorting in descending order or sorting in ascending order. The division may be equal division, or the division may be performed based on a preset value.

Figure 5:
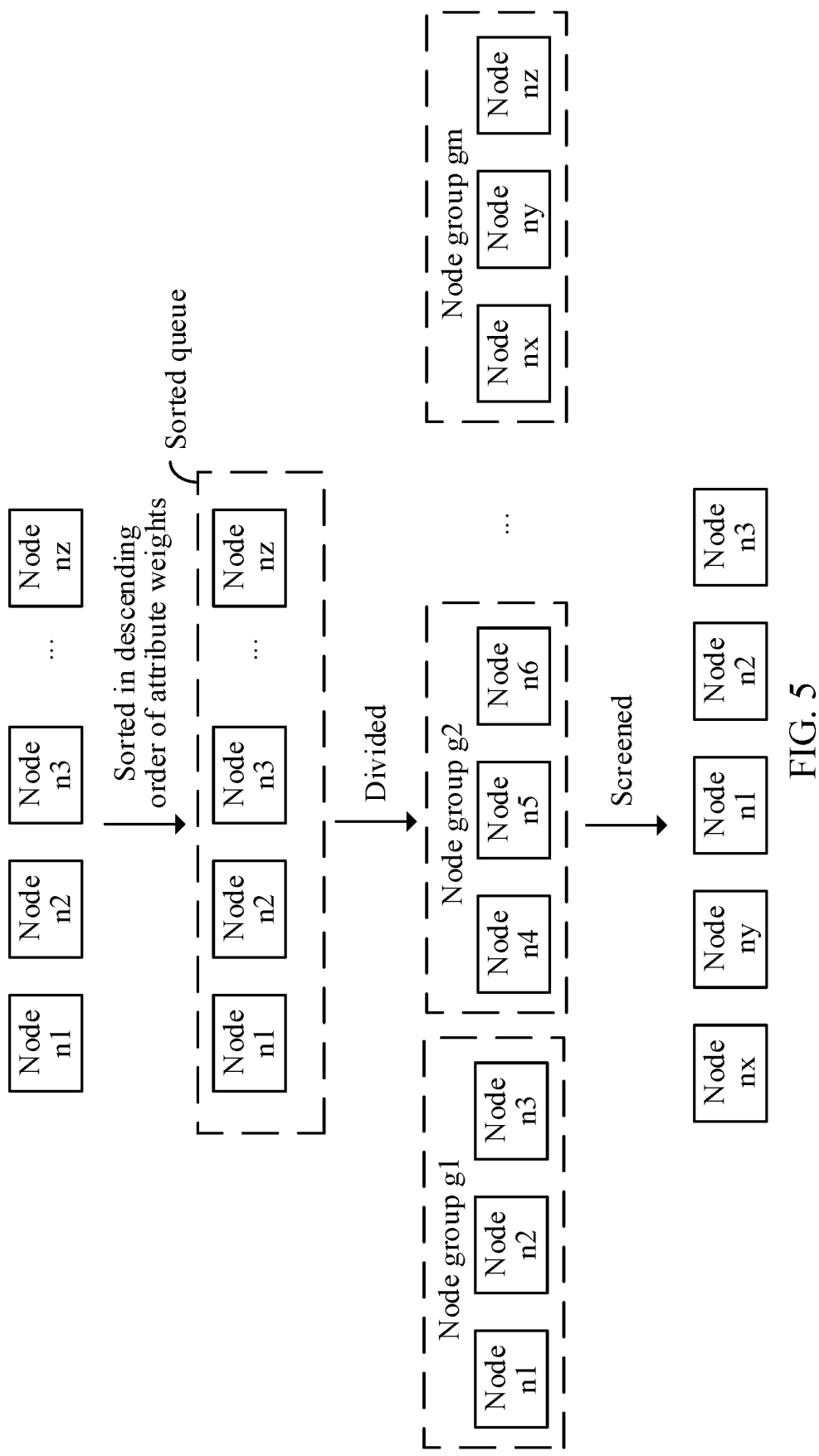
FIG. 5 is a schematic diagram of a node group according to an embodiment of this application.

For example, the nodes include a node n1, a node n2, . . . and a node nz, the first node is the node n1, and an attribute weight w1 of the node n1>an attribute weight w2 of the node n2> . . . >an attribute weight wz of the node nz. In this case, a sorted queue may be shown in FIG. 5. After the sorted queue is equally divided, obtained node groups may be shown in FIG. 5.

The first node may obtain, when detecting that generation switching needs to be performed, the attribute weights corresponding to the nodes in the blockchain, and group the nodes in an order of the attribute weights, to obtain a plurality of node groups. Alternatively, the first node may obtain, when receiving a selection instruction, the attribute weights corresponding to the nodes in the blockchain.

S202. Select a node group whose attribute weight meets a preset condition from the plurality of node groups, to obtain a target node group, and select a preset quantity of candidate consensus nodes from the target node group.

The node group whose attribute weight meets the preset condition may be a node group with a larger attribute weight in the node groups. For example, a node group with a second largest attribute weight in the node groups may be used as a target node group, or a node group with a largest attribute weight in the node groups may be used as a target node group.

After obtaining the node groups, the first node may first determine attribute weights of the node groups based on attribute weights of nodes in the node groups, and then compare the attribute weights of the node groups, to obtain the node group with the largest attribute weight in the node groups.

Alternatively, the first node may compare a largest attribute weight of a node in a node group with a smallest attribute weight of a node in another node group. If the largest attribute weight is less than the smallest attribute weight, it indicates that an attribute weight of the node group corresponding to the smallest attribute weight is greater than an attribute weight of the other node group.

Figure 6:
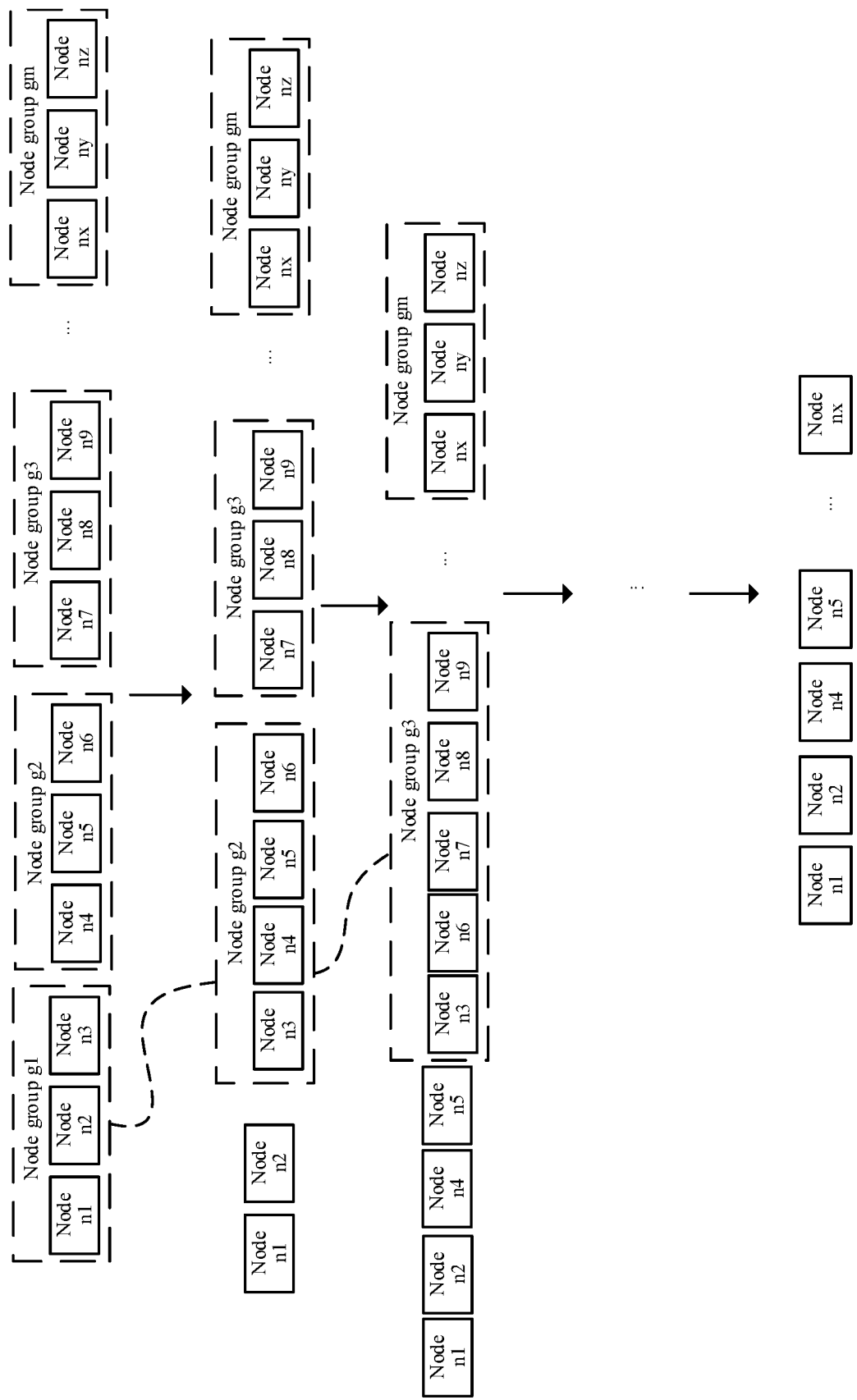
FIG. 6 is a schematic diagram of a screening process of candidate consensus nodes according to an embodiment of this application.

Alternatively, if the node groups are obtained by dividing a sorted queue (sorted in descending order), a node group arranged in front may be directly used as a target node group. For example, as shown in FIG. 6, a node group g1 is directly used as a target node group.

After obtaining the target node group, the first node may select a preset quantity of candidate consensus nodes from the target node group. The candidate consensus nodes may be nodes with larger attribute weights in the target node group, that is, a plurality of nodes starting from a head of sorting in descending order of the attribute weights. Alternatively, the candidate consensus nodes may be a plurality of nodes with smaller attribute weights in the target node group, that is, a plurality of nodes starting from a tail of sorting in descending order of the attribute weights.

For example, when the target node group is the node group g1, candidate consensus nodes are the node n1 and the node n2, and a non-candidate consensus node is the node n3. Because the attribute weight of the node n1 is greater than the attribute weight of the node n2, and the attribute weight of the node n2 is greater than the attribute weight of the node n3, in this case, the selected candidate consensus nodes are nodes with larger attribute weights.

The first node may obtain a preset threshold of the target node group, and then use a node corresponding to an attribute weight greater than the preset threshold as a candidate consensus node. Alternatively, the first node may use a node corresponding to an attribute weight less than the preset threshold as a candidate consensus node. Each target node group differs in corresponding preset thresholds, and each target node group also differs in whether using a node corresponding to an attribute weight greater than a preset threshold as a candidate consensus node or using a node corresponding to an attribute weight less than the preset threshold as a candidate consensus node, so that the candidate consensus node is a node with a larger attribute weight in the target node group or a node with a smaller attribute weight in the target node group.

For example, for a node group g1 and a node group g2, the node group g1 corresponds to a preset threshold t1, and the node group g2 corresponds to a preset threshold t2. When the node group g1 is used as a target node group, a node corresponding to an attribute weight greater than the preset threshold t1 may be used as a candidate consensus node. When the node group g2 is used as a target node group, a node corresponding to an attribute weight less than the preset threshold t2 may be used as a candidate consensus node.

Alternatively, the first node may randomly select a preset quantity of candidate consensus nodes from the target node group, so that the candidate consensus nodes are nodes with larger attribute weights in the target node group or nodes with smaller attribute weights in the target node group.

A method for randomly selecting a preset quantity of candidate consensus nodes from the target node group may be selected depending on an actual situation. For example, a preset quantity of candidate consensus nodes may be selected from the target node group by using a random function. The random function may be a verifiable random function (VRF) or a pseudo random function, which is not limited herein in this embodiment of this application.

When a preset quantity of candidate consensus nodes are randomly selected from the target node group, the selecting a preset quantity of candidate consensus nodes from the target node group includes: determining, based on a first preset quantity and the preset quantity, a random number corresponding to the target node group: and randomly selecting a preset quantity of candidate consensus nodes from the target node group based on the random number.

The first node may determine a probability of each preset value based on the first preset quantity and the preset quantity by using a random function, and then use a preset value with a largest probability as the random number corresponding to the target node group.

Alternatively, the first node may use, by using a random function, the preset quantity as a target quantity of random numbers corresponding to the target node group, and then generate, within the first preset quantity, a target quantity of random numbers corresponding to the target node group. That is, a value of the random number is less than or equal to the first preset quantity, and is greater than or equal to 0. In this case, the preset quantity represents a quantity of random numbers, and the first preset quantity represents a value range within which the random numbers are located.

For example, the first preset quantity is 3, and the preset quantity is 2. In this case, it indicates to generate two random numbers within [0, 3].

After obtaining the random number, the first node selects a preset quantity of candidate consensus nodes from the target node group based on the random number.

In the foregoing solution, the first node may use the random number as a node sequence number in the target node group, and then use a node corresponding to the node sequence number as a candidate consensus node corresponding to the target node group.

For example, random numbers are 1 and 2, a node corresponding to a sequence number 1 is the node n1, and a node corresponding to a sequence number 2 is the node n2. In this case, the node n1 and the node n2 are used as candidate consensus nodes corresponding to the target node group.

In this embodiment of this application, a random number is used as a node sequence number in the target node group, and then a node corresponding to the node sequence number is used as a candidate consensus node corresponding to the target node group. In this way, the candidate consensus node is randomly selected from the target node group, so that the candidate consensus node is a node with a larger attribute weight in the target node group or a node with a smaller attribute weight in the target node group.

S203. Store a non-candidate consensus node in the target node group into an initial node group, the initial node group being a group other than the target node group in the plurality of node groups and matching the target node group.

A node group other than the target node group in the plurality of node groups may become a candidate node group. For example, the plurality of node groups may be shown in FIG. 6, the target node group is g1, and candidate node groups may include a node group g2, a node group g3, . . . , and a node group gm.

The initial node group is a group other than the target node group in the plurality of node groups and matching the target node group, and may be understood as a node group that is in the candidate node groups and that also meets the preset condition as the target node group. For example, if the target node group is a node group with a largest attribute weight in the node groups, the initial node group may be understood as a node group with a largest attribute weight in the candidate node groups.

In this embodiment of this application, when a node in the target node group is determined as a non-candidate consensus node corresponding to the target node group, the non-candidate consensus node in the target node group may be stored into the initial node group, and then a candidate consensus node is further selected from the initial node group, so that a node with a larger attribute weight participates in screening a plurality of times, thereby increasing a probability that the node with the larger attribute weight is selected as a candidate consensus node.

For example, the node groups may be shown in FIG. 6. The target node group is the node group g1, the initial node group is the node group g2, candidate consensus nodes corresponding to the target node group are the node n1 and the node n2, and a non-candidate consensus node in the target node group is the node n3. In this case, the node n3 is stored into the node group g2. The node group g2 may be shown in FIG. 6.

When the node groups are obtained by dividing a sorted queue, the storing a non-candidate consensus node in the target node group into an initial node group includes:

selecting, from candidate node groups, a candidate node group that is adjacent to the target node group and whose attribute weight is less than that of the target node group, to obtain an initial node group matching the target node group, the candidate node group being a node group other than the target node group in the plurality of node groups: and storing the non-candidate consensus node in the target node group into the initial node group.

For example, as shown in FIG. 6, after obtaining the node groups, the first node directly uses the node group g1 arranged at the first place as a target node group. After the node n1 and the node n2 are selected from the node group g1 as candidate consensus nodes, because the node group g2 is a node group that is adjacent to the node group g1 and whose attribute weight is less than that of the node group g1, the node group g2 is used as an initial node group, and the non-candidate consensus node n3 in the node group g1 is stored into the node group g2.

Alternatively, after the candidate consensus node and the non-candidate consensus node of the target node group are obtained, the target node group does not exist, and in this case, a node group arranged in front may be used as an initial node group. For example, as shown in FIG. 6, after the candidate consensus nodes and the non-candidate consensus node of the node group g1 are obtained, the node group g1 does not exist. In this case, the node group g2 is arranged at the first place, and the first node may use the node group g2 arranged at the first place as an initial node group.

S204. Use the initial node group as a target node group, and return to the operation of selecting a candidate consensus node from the target node group, until all of the plurality of node groups are screened.

After obtaining the initial node group, the first node uses the initial node group as a target node group, and returns to the operation of selecting a candidate consensus node from the target node group, until all of the plurality of node groups are screened.

For example, as shown in FIG. 6, after obtaining the node groups, the first node uses the node group g1 with a largest attribute weight in the node groups as a target node group, and then selects the node n1 and the node n2 from the target node group as candidate consensus nodes, and uses the node n3 as a non-candidate consensus node.

The first node uses the node group g2 with a largest attribute weight in candidate node groups as an initial node group, and stores the node n3 into the node group g2. Then, the first node selects the nodes n4 and n5 from the node group g2 as candidate consensus nodes, and uses the node n3 and the node n6 as non-candidate consensus nodes.

The first node uses the node group g3 with a largest attribute weight in candidate node groups as an initial node group, and stores the node n3 and the node n6 into the node group g3, and then selects a candidate consensus node and a non-candidate consensus node from the node group g3. The process is repeated, until a candidate consensus node is selected from the node group gm, and selection of candidate consensus nodes stops.

It is to be understood that, a quantity of times of selecting a candidate consensus node from a target node group may be determined based on a quantity of node groups. For example, when the quantity of node groups is m, it indicates that the first node repeats m times the operation of selecting a candidate consensus node from the target node group.

When the initial node group is used as a target node group, and the operation of selecting a candidate consensus node from the target node group is returned to, a candidate consensus node selected from the initial node group may be a node with a larger attribute weight in the initial node group, or may be a node with a smaller attribute weight in the initial node group.

For example, as shown in FIG. 6, after obtaining the node groups, the first node uses the node group g1 with a largest attribute weight in the node groups as a target node group, and then selects the node n1 and the node n2 from the target node group as candidate consensus nodes, and uses the node n3 as a non-candidate consensus node.

Because the attribute weight of the node n1 is greater than the attribute weight of the node n2, and the attribute weight of the node n2 is greater than the attribute weight of the node n3, in this case, nodes with larger attribute weights in the target node group are used as candidate consensus nodes.

The first node uses the node group g2 with a largest attribute weight in candidate node groups as an initial node group, and stores the node n3 into the node group g2. Then, the first node selects the nodes n4 and n5 from the node group g2 as candidate consensus nodes, and uses the node n3 and the node n6 as non-candidate consensus nodes.

Because the attribute weight of the node n3 is greater than the attribute weight of the node n4, the attribute weight of the node n4 is greater than the attribute weight of the node n5, and the attribute weight of the node n5 is greater than the attribute weight of the node n6, in this case, nodes with smaller attribute weights in the initial node group are used as candidate consensus nodes.

After the non-candidate consensus node is stored into the initial node group, a quantity of nodes included in the initial node group changes. In this case, when the operation of selecting a candidate consensus node from the target node group is returned to, the first preset quantity may be the quantity of nodes included in the initial node group.

A node in different node groups may be a candidate consensus node, and may also be a non-candidate consensus node. For example, when the node group g1 is a target node group, the node n1 and the node n2 are used as candidate consensus nodes corresponding to the node group g1, and the node n3 is a non-candidate consensus node corresponding to the node group g1. When the node group g2 is a target node group, the node n3 and the node n5 are used as candidate consensus nodes corresponding to the node group g2. That is, in the node group g1, the node n3 is a non-candidate consensus node, and in the node group g2, the node n3 is a candidate consensus node.

S205. Broadcast candidate consensus nodes to a second node in the nodes for verification.

When a node receives the broadcast candidate consensus nodes, the node may be referred to as a second node. It is to be understood that, a node may be a first node and a second node at the same time. For example, the node n1 selects candidate consensus nodes from the node groups, the node n2 also selects candidate consensus nodes from the node groups, and the node n1 and the node n2 are both referred to as a first node. After the node n1 selects the candidate consensus nodes from the node groups, if receiving the candidate consensus nodes broadcast by the node n2, the node n1 is referred to as a second node. After the node n2 selects the candidate consensus nodes from the node groups, if receiving the candidate consensus nodes broadcast by the node n1, the node n2 is referred to as a second node.

After obtaining a candidate consensus node of one target node group, the first node may first broadcast the candidate consensus node of the target node group. That is, after the first node selects the preset quantity of candidate consensus nodes from the target node group, step S205 is first performed, and then step S203 is performed. Alternatively, the first node may broadcast, after obtaining candidate consensus nodes of all the node groups, all the candidate consensus nodes. That is, after the first node selects the preset quantity of candidate consensus nodes from the target node group, step S203 and step S204 are first performed, and then step S205 is performed. This is not limited herein in this embodiment of this application.

The broadcasting candidate consensus nodes to a second node in the nodes for verification may be understood as broadcasting identifiers corresponding to the candidate consensus nodes to the second node in the nodes for verification. Alternatively, the identifiers of the candidate consensus nodes may be first mapped to obtain a mapping result, and then the mapping result is broadcast to the second node in the nodes for verification.

When the identifiers of the candidate consensus nodes are mapped to obtain a mapping result, and then the mapping result is broadcast to the second node in the nodes for verification, the identifiers of the plurality of candidate consensus nodes may be combined to obtain a combined identifier, and then hash mapping is performed on the combined identifier to obtain a mapping result. Alternatively, hash mapping is performed on an identifier of each candidate consensus node, to obtain a sub-mapping result of each candidate consensus node, and then a mapping result is determined based on the sub-mapping result of each candidate consensus node.

When hash mapping is performed on an identifier of each candidate consensus node, to obtain a sub-mapping result of each candidate consensus node, and then a mapping result is determined based on the sub-mapping result of each candidate consensus node, the broadcasting candidate consensus nodes to a second node in the nodes for verification includes:

calculating a Merkle_root of the candidate consensus nodes: and broadcasting the Merkle_root to the second node in the nodes for verification.

The Merkle_root is a hash value obtained after hash is performed on objects and hash results of the objects are added, or a hash value obtained after hash addition is further performed on the hash results of the objects. The object may be a transaction, or the object may be a node.

A process of calculating a Merkle_root of the candidate consensus nodes may be as follows: The first node first performs hash on each candidate consensus node, to obtain a hash value corresponding to each candidate consensus node, and then performs hash on hash values of adjacent candidate consensus nodes, to obtain a candidate hash value. If a quantity of candidate hash values is not one, hash is further performed on hash values of adjacent candidate consensus nodes, until when a quantity of obtained candidate hash value is one, the candidate hash value is used as the Merkle_root of the candidate consensus nodes.

Figure 7:
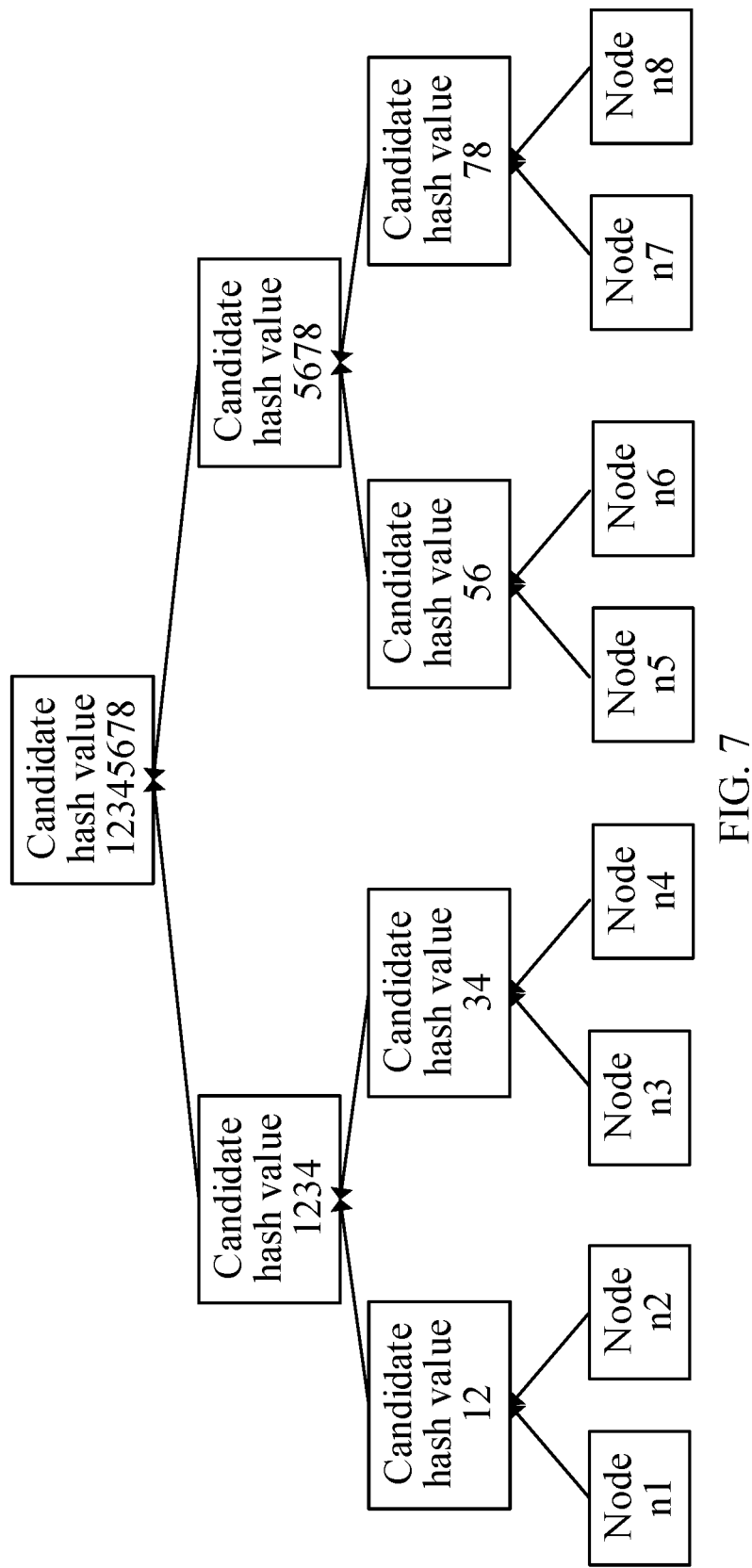
FIG. 7 is a schematic diagram of a calculation process of a Merkle root of candidate consensus nodes according to an embodiment of this application.

For example, as shown in FIG. 7, candidate consensus nodes include a node n1, a node n2, a node n3, a node n4, a node n5, a node n6, a node n7, and a node n8. In this case, hash is performed on each of the nodes n1 to n8, to obtain hash values corresponding to the nodes n1 to n8. Then, hash is further performed on the hash value of the node n1 and the hash value of the node n2, to obtain a candidate hash value 12, hash is further performed on the hash value of the node n3 and the hash value of the node n4, to obtain a candidate hash value 34, hash is further performed on the hash value of the node n5 and the hash value of the node n6, to obtain a candidate hash value 56, and hash is further performed on the hash value of the node n7 and the hash value of the node n8, to obtain a candidate hash value 78.

Due to the four candidate hash values, hash is further performed on the candidate hash value 12 and the candidate hash value 34, to obtain a candidate hash value 1234, and hash is further performed on the candidate hash value 56 and the candidate hash value 78, to obtain a candidate hash value 5678. In this case, due to the two candidate hash values, hash is further performed on the candidate hash value 1234 and the candidate hash value 5678, to obtain a candidate hash value 12345678. In this case, only one candidate hash value 12345678 is left, and the candidate hash value 12345678 is used as a Merkle root of the candidate consensus nodes.

In this embodiment of this application, the Merkle root of the candidate consensus nodes is broadcast, thereby reducing complexity of message communication between nodes. In addition, when the Merkle root is broadcast, only the Merkle root of the candidate consensus nodes is broadcast, rather than a Merkle root of all the nodes, thereby further reducing complexity of message communication between nodes.

S206. Use the candidate consensus nodes as target consensus nodes of the blockchain when verification success information for the candidate consensus nodes from the second node is received within a preset time period.

The blockchain has different consensus nodes in different generations. The using the candidate consensus nodes as target consensus nodes of the blockchain may be understood as using the candidate consensus nodes as target consensus nodes of the blockchain in a next generation.

After receiving the candidate consensus nodes, the second node may compare the candidate consensus nodes with candidate consensus nodes selected by the second node from node groups. If a comparison result is the same, verification on the candidate consensus nodes succeeds. If the comparison result is different, verification on the candidate consensus nodes fails.

If receiving the Merkle root, the second node may compare the Merkle root with a Merkle root calculated by the second node. If a comparison result is the same, verification on the candidate consensus nodes succeeds. If the comparison result is different, verification on the candidate consensus nodes fails.

When the first node first broadcasts a candidate consensus node of one target node group, the first node may receive verification success information for the candidate consensus nodes from the second node with the preset time period, and after using the candidate consensus node as a target consensus node of the blockchain, store a non-candidate consensus node of the target node group into an initial node group, use the initial node group as a target node group, and return to the operation of selecting a candidate consensus node from the target node group.

Alternatively, when broadcasting a candidate consensus node of one target node group, the first node may store a non-candidate consensus node of the target node group into an initial node group, use the initial node group as a target node group, and return to the operation of selecting a candidate consensus node from the target node group. This is not limited herein in this embodiment of this application.

In the foregoing solution, the first node may use the candidate consensus nodes as target consensus nodes of the blockchain only when a quantity of pieces of verification success information for the candidate consensus nodes received within the preset time period meets a preset quantity.

For example, the preset quantity is 3, a node n1 broadcasts candidate consensus nodes to a node n2, a node n3, a node n4, and a node n5 for verification, and verification success information for the candidate consensus nodes from the node n2, the node n3, and the node n4 is received within the preset time period. Because the verification success information for the candidate consensus nodes from the three nodes is received within the preset time period, the candidate consensus nodes are used as target consensus nodes of the blockchain.

If no verification success information for the candidate consensus nodes from the second node is received within the preset time period, the candidate consensus nodes are not used as target consensus nodes of the blockchain. This may be caused by inconsistency between attribute information of the nodes that is included in a memory of the first node and attribute information of the nodes that is included in a memory of another node. In this case, the first node may obtain the attribute information of the nodes from the another node by using a state synchronization method, and then reselect candidate consensus nodes, that is, perform steps S201 to S206 again.

After the target consensus nodes of the blockchain are obtained, the target consensus nodes may be used to package a transaction into a target block and perform verification on the target block. If the verification performed by the target consensus nodes on the target block succeeds, the target block is broadcast in the blockchain, so that a non-consensus node and the target consensus nodes in the blockchain store the target block into blockchains stored on the non-consensus node and the target consensus nodes.

Figure 8:
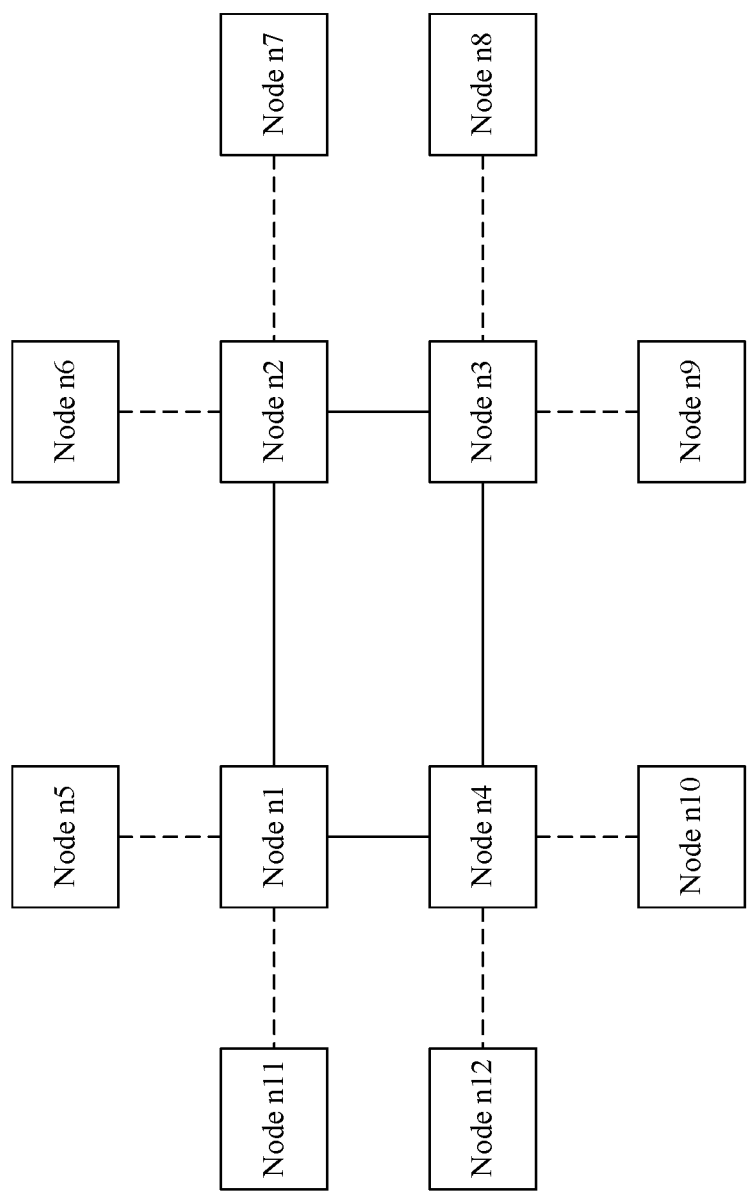
FIG. 8 is a schematic diagram of another blockchain according to an embodiment of this application.

For example, the blockchain may be shown in FIG. 8, a node n1, a node n2, a node n3, and a node n4 are target consensus nodes in the blockchain, a node n5, a node n6, a node n7, a node n8, a node n9, a node n10, a node n11, and a node n12 are non-consensus nodes in the blockchain, a solid line indicates that the node can participate in consensus, and a dashed line indicates that the node performs only synchronization of a target block, which passively receive a block, and cannot participate in consensus.

In some embodiments, a process of using the target consensus nodes to package a transaction into a target block and perform verification on the target block is as follows:

A target consensus node is selected from the target consensus nodes as a master node to package a transaction into a target block and send the target block to another consensus node in the target consensus nodes. The another consensus node in the target consensus nodes is a target consensus node other than the master node in the target consensus nodes. Then, the another consensus node in the target consensus nodes performs verification on the target block. If the verification performed by the another consensus node on the target block succeeds, the master node broadcasts the target block in the blockchain, so that a non-consensus node in the blockchain may store the target block into a blockchain stored on the non-consensus node, and the target consensus nodes in the blockchain may store the target block into blockchains stored on the target consensus nodes.

Therefore, when the first node is a master node, after the using the candidate consensus nodes as target consensus nodes of the blockchain, the method further includes:

obtaining a target block, and performing a consensus on the target block by using the target consensus nodes: and storing the target block into the blockchain when the consensus on the target block succeeds.

The first node may obtain current transaction data, and then package the current transaction data into a target block. If a consensus on the target block succeeds, the target block is stored into a blockchain stored on the first node, and the target block is broadcast in the blockchain at the same time, so that another node in the blockchain may store the target block into a blockchain stored on the another node.

In this embodiment of this application, the target consensus nodes in the blockchain are used to generate a block and perform verification on the block, so that a quantity of nodes that generate a block and perform verification on the block is reduced, thereby reducing communication complexity, and improving consensus efficiency.

However, when the target consensus nodes are used to generate a block and perform verification on the block, most nodes in the blockchain do not participate in consensus, that is, do not have a right to vote on the block, and the right to vote is held by a few nodes, leading to a problem of centralization.

To resolve the problem of centralization, in some other embodiments, the storing the target block into the blockchain when the consensus on the target block succeeds includes:
    broadcasting the target block to a non-consensus node in the blockchain for verification when the consensus on the target block succeeds; and
    storing the target block into the blockchain when a quantity of non-consensus nodes that succeed in verification on the target block meets a preset quantity requirement.

Figure 9:
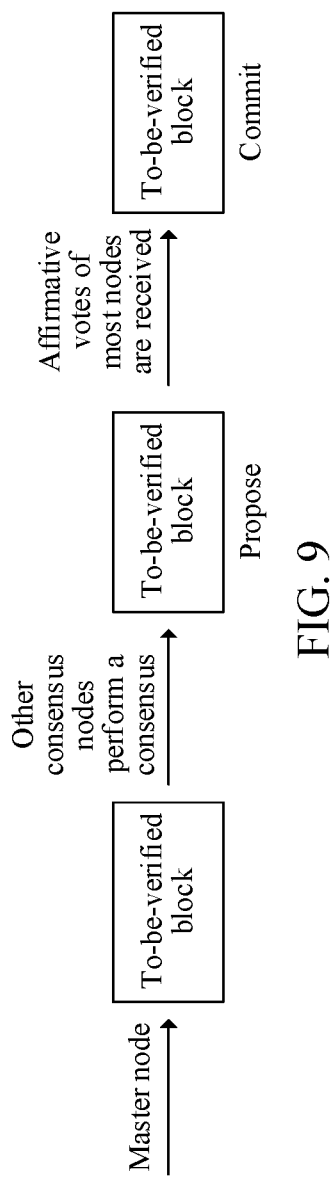
FIG. 9 is a schematic diagram of another block generation process according to an embodiment of this application.

For example, as shown in FIG. 9, after generating the target block, the master node sends the target block to another consensus node for verification. If verification performed by the another consensus node on the target block succeeds, the target block is broadcast in the blockchain. If a quantity of non-consensus nodes that succeed in verification on the target block meets the preset quantity requirement, the target block is stored into the blockchain.

In this case, after a consensus is reached on the target block in the target consensus nodes, it may merely indicate that the target block is proposed, which is referred to as a propose stage. After the propose stage, a target consensus node broadcasts the target block in the blockchain, so that non-consensus nodes receive the target block. Each non-consensus node votes on the target block after receiving the target block. The target block is approved by receiving affirmative votes of most non-consensus nodes. After affirmative votes of most nodes are received, the target block is approved, which is referred to as a commit stage.

Figure 10:
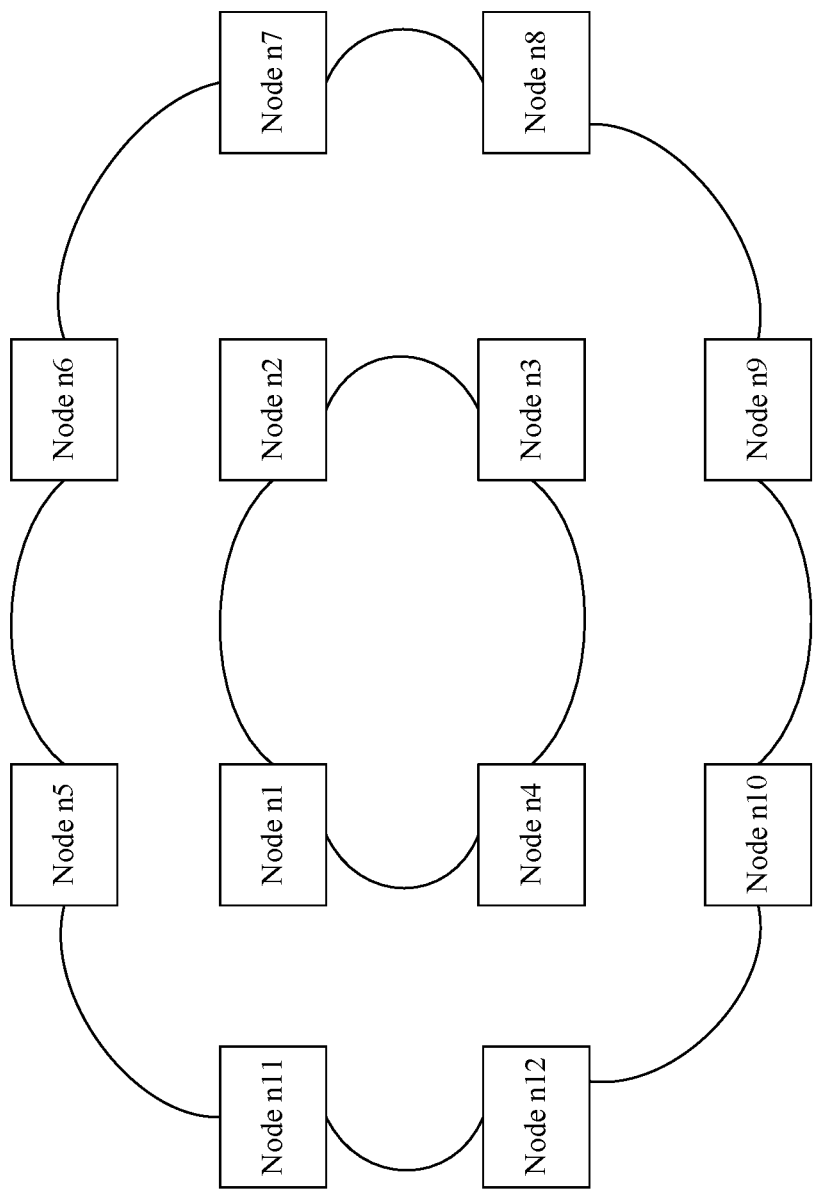
FIG. 10 is a schematic diagram of another blockchain according to an embodiment of this application.

In this case, the blockchain may be shown in FIG. 10, a node n1, a node n2, a node n3, and a node n4 are target consensus nodes in the blockchain, a node n5, a node n6, a node n7, a node n8, a node n9, a node n10, a node n11, and a node n12 are non-consensus nodes in the blockchain, and a solid line indicates that the node can participate in consensus, that is, indicates that a non-consensus node can also participate in consensus.

In this embodiment of this application, when the consensus performed by the target consensus nodes on the target block succeeds, the target block is not immediately stored into the blockchain, but instead, the non-consensus node in the blockchain performs verification on the target block. The target block is stored into the blockchain only when the quantity of non-consensus nodes that succeed in verification on the target block meets the preset quantity requirement, so that the non-consensus node in the blockchain can also participate in the consensus process, thereby reducing a concentration degree.

In some other embodiments, the storing the target block into the blockchain when a quantity of non-consensus nodes that succeed in verification on the target block meets a preset quantity requirement includes:
    obtaining a previous block of the target block when the quantity of non-consensus nodes that succeed in verification on the target block meets the preset quantity requirement: and
    storing the target block into the blockchain when a quantity of non-consensus nodes that succeed in verification on the previous block meets a preset quantity requirement.

In the entire blockchain, a block receives an affirmative vote and a disapproval vote. If the disapproval vote meets a requirement, it indicates that a consensus cannot be reached on the block. A consensus node needs to detect whether a previous block of a block generated by the consensus node receives sufficient affirmative votes, and only if a consensus is reached on the previous block, the target block is stored into the blockchain.

If a consensus cannot be reached on the previous block, the consensus node needs to take over responsibilities of a consensus node that generates the previous block, to generate a previous block. In this case, after the obtaining a previous block of the target block when the quantity of non-consensus nodes that succeed in verification on the target block meets the preset quantity requirement, the method further includes:
    generating a previous block and using the previous block as a target block when the quantity of non-consensus nodes that succeed in verification on the previous block does not meet the preset quantity requirement: and
    returning to the operation of obtaining a target block, and performing a consensus on the target block by using the target consensus nodes.

In this case, the current block is packaged by a next consensus node to the consensus node.

Figure 11:
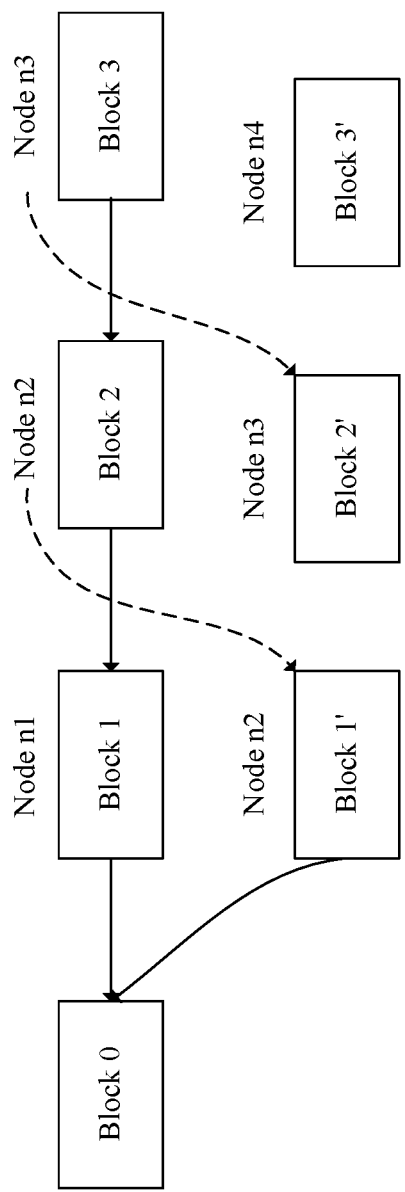
FIG. 11 is a schematic diagram of another block generation process according to an embodiment of this application.

For example, as shown in FIG. 11, a block 2 is a current block, and during verification on the block 2, the node n2 finds that a quantity of non-consensus nodes that succeed in verification on a block 1 does not meet a preset quantity requirement, the node n2 generates a block 1', and a node n3 generates a block 2'.

It can be learned from above that in this embodiment of this application, attribute weights corresponding to nodes in a blockchain are obtained, and the nodes are grouped in an order of the attribute weights, to obtain a plurality of node groups. A node group whose attribute weight meets a preset condition is selected from the plurality of node groups, to obtain a target node group, and a preset quantity of candidate consensus nodes are selected from the target node group. A non-candidate consensus node in the target node group is stored into an initial node group, the initial node group being a group other than the target node group in the plurality of node groups and matching the target node group. The initial node group is used as a target node group, and the operation of selecting a candidate consensus node from the target node group is returned to, until all of the plurality of node groups are screened. Candidate consensus nodes are broadcast to a second node in the nodes for verification. The candidate consensus nodes are used as target consensus nodes of the blockchain when verification success information for the candidate consensus nodes from the second node is received within a preset time period.

That is, in this embodiment of this application, the nodes are grouped in an order of the attribute weights, the node group whose attribute weight meets the preset condition is used as a target node group, and a candidate consensus node is selected from the target node group. The candidate consensus node selected from the target node group may be a node with a larger attribute weight in the target node group, or may be a node with a smaller attribute weight in the target node group.

A non-candidate consensus node in the target node group is stored into an initial node group, and a candidate consensus node is further selected from the initial node group. The candidate consensus node selected from the initial node group may be a node with a larger attribute weight in the initial node group, or may be a node with a smaller attribute weight in the initial node group.

The target node group whose attribute weight meets the preset condition may be, for example, a node group with a larger attribute weight, and the initial node group is a group other than the target node group in the plurality of node groups and matching the target node group. Therefore, when the non-candidate consensus node in the target node group is stored into the initial node group to re-participate in screening, a quantity of screening times of a node with a larger attribute weight in the plurality of nodes can be increased, thereby increasing a probability that the node with the larger attribute weight in the plurality of nodes is selected as a candidate consensus node.

The candidate consensus node selected from the target node group may be a node with a larger attribute weight in the target node group, or may be a node with a smaller attribute weight in the target node group. The candidate consensus node selected from the initial node group may be a node with a larger attribute weight in the initial node group, or may be a node with a smaller attribute weight in the initial node group. Therefore, candidate consensus nodes obtained when the screening is completed may be nodes with larger attribute weights in the plurality of nodes, or may be nodes with smaller attribute weights in the plurality of nodes. In this way, a node with a larger attribute weight can be provided with a higher probability of being selected, a node with a smaller attribute weight can be provided with a chance to be selected, and a probability that a perpetrator node is selected as a consensus node can be reduced, thereby reducing a probability of a consensus node error in a consensus process, and improving stability of a blockchain network.

The method described in the foregoing embodiment is described in further detail below by using examples.

The node selection method in the embodiments of this application may be applied to a process of selecting a consensus node in a blockchain. The following describes a consensus node selection process when the node selection method in the embodiments of this application is applied to a DPOS consensus mechanism of a blockchain.

Figure 12:
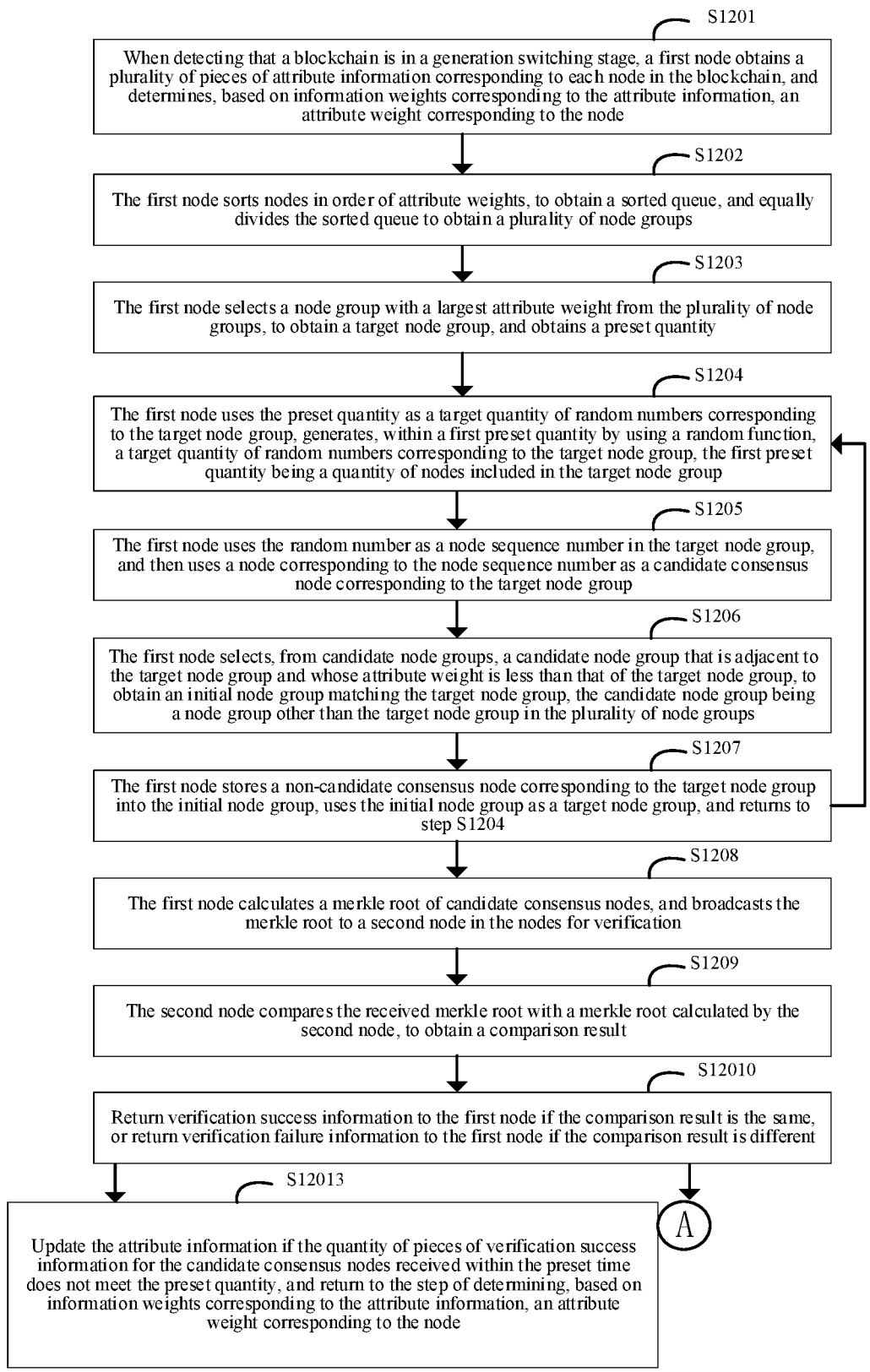
FIG. 12 is a schematic flowchart of another node selection method according to an embodiment of this application.

FIG. 12 is a schematic flowchart of a node selection method according to an embodiment of this application. A procedure of the node selection method may include the following steps:

S1201. When detecting that the blockchain is in a generation switching stage, a first node obtains a plurality of pieces of attribute information corresponding to each node in the blockchain, and determines, based on information weights corresponding to the attribute information, an attribute weight corresponding to the node.

In the DPOS consensus mechanism, usually in the last block of a generation, information about a consensus node of a next generation is determined, and the information about the consensus node of the next generation is stored into the blockchain. However, to ensure a relatively large quantity of consensus nodes, there is a relatively large amount of information about consensus nodes of the next generation. As a result, the block storing the information about the consensus nodes of the next generation is relatively large.

In addition, for the sake of profit, a consensus node sometimes may deliberately perform perpetration, and select itself as a candidate node of the next generation. The process is performed without another node, making it difficult to ensure security.

Therefore, in this embodiment of this application, the generation switching stage is added to implement consensus node selection, so that perpetration of a consensus node can be avoided, to improve security. In addition, information about a consensus node is not stored into the blockchain, but recorded only on the node locally, so that a size of the blockchain is reduced.

Figure 13:
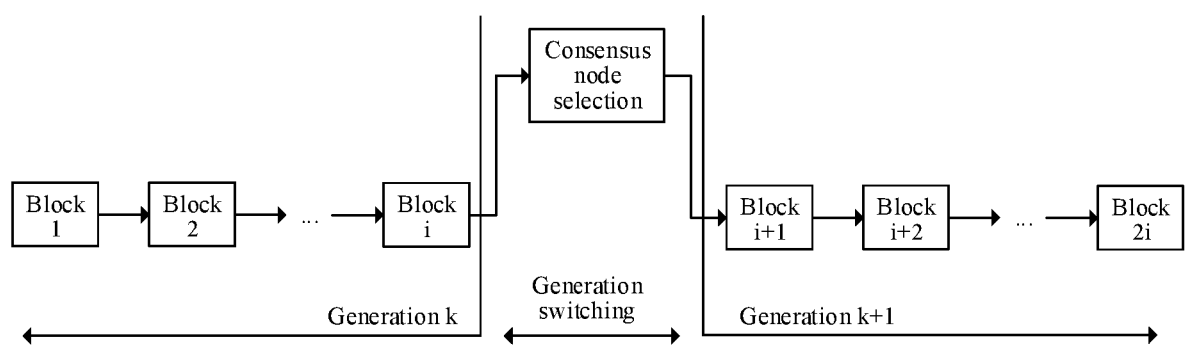
FIG. 13 is a schematic diagram of generation switching according to an embodiment of this application.

For example, as shown in FIG. 13, when a generation k ends, a generation switching stage starts. In the generation switching stage, a consensus node is selected, and no block is generated. When the generation switching stage ends, a block starts to be generated in a generation k+1.

Figure 14:
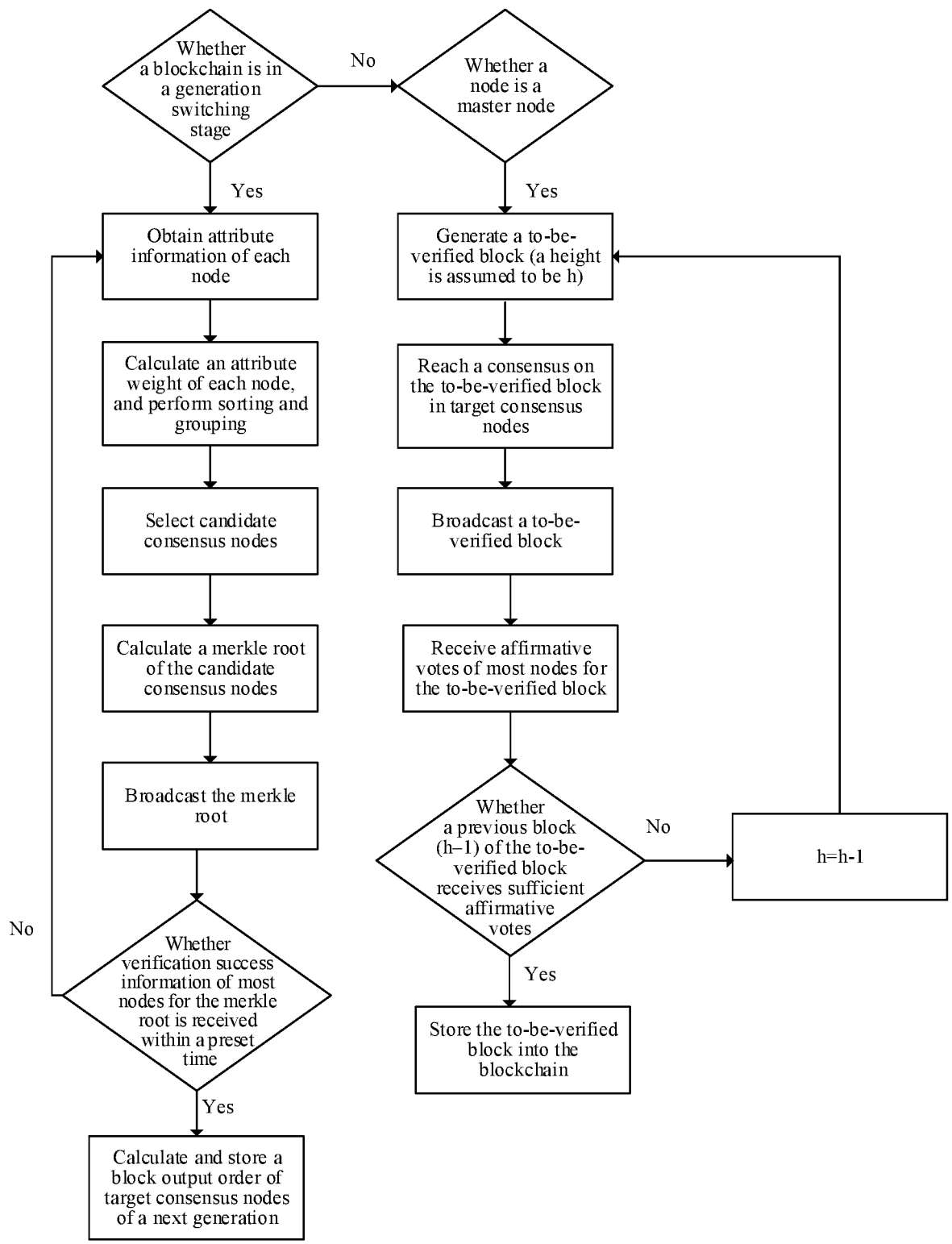
FIG. 14 is a schematic flowchart of another node selection method according to an embodiment of this application.

That is, when obtaining transaction data, the first node may detect whether the blockchain is in a generation switching stage, and if the blockchain is in a generation switching stage, obtain a plurality of pieces of attribute information corresponding to each node in the blockchain, or if the blockchain is not in a generation switching stage, determine whether the first node is a master node, as shown in FIG. 14.

S1202. The first node sorts nodes in an order of attribute weights, to obtain a sorted queue, and equally divides the sorted queue to obtain a plurality of node groups.

S1203. The first node selects a node group with a largest attribute weight from the plurality of node groups, to obtain a target node group, and obtains a preset quantity.

S1204. The first node uses the preset quantity as a target quantity of random numbers corresponding to the target node group, generates, within a first preset quantity by using a random function, a target quantity of random numbers corresponding to the target node group, the first preset quantity being a quantity of nodes included in the target node group.

S1205. The first node uses the random number as a node sequence number in the target node group, and then uses a node corresponding to the node sequence number as a candidate consensus node corresponding to the target node group.

S1206. The first node selects, from candidate node groups, a candidate node group that is adjacent to the target node group and whose attribute weight is less than that of the target node group, to obtain an initial node group matching the target node group, the candidate node group being a node group other than the target node group in the plurality of node groups.

S1207. The first node stores a non-candidate consensus node corresponding to the target node group into the initial node group, uses the initial node group as a target node group, and returns to step S1204.

S1208. The first node calculates a Merkle_root of candidate consensus nodes, and broadcasts the Merkle_root to a second node in the nodes for verification.

S1209. The second node compares the received Merkle_root with a Merkle root calculated by the second node, to obtain a comparison result.

S12010. Return verification success information to the first node if the comparison result is the same, or return verification failure information to the first node if the comparison result is different.

S12011. The first node uses the candidate consensus nodes as target consensus nodes of the blockchain if a quantity of pieces of verification success information for the candidate consensus nodes received within a preset time period meets a preset quantity.

S12012. The first node calculates and stores a block output order of the target consensus nodes.

S12013. Update the attribute information if the quantity of pieces of verification success information for the candidate consensus nodes received within the preset time period does not meet the preset quantity, and return to the step of determining, based on information weights corresponding to the attribute information, an attribute weight corresponding to the node.

It is to be understood that, when selecting candidate consensus nodes from node groups in round 0, the first node may determine a seed of the random function based on a hash value (BlockHash) in the last block of a previous generation, and then obtain a random number of a target node group based on the random function. If verification on the candidate consensus nodes obtained in round 0 fails, in a return process, the first node may determine a seed of the random function based on a round number (the round number may be, for example, round 0, round 1, or round 2) and the hash value in the last block of the previous generation.

The seed of the random function is determined based on the hash value in the last block of the previous generation, so that randomness of the random number can be ensured because the hash value in the last block of the previous generation is unpredictable before the last block of the previous generation is generated.

S12014. A target consensus node obtains current transaction data, and determines, based on the block output order of the target consensus nodes, whether the target consensus node is a master node.

S12015. If the target consensus node is a master node, the master node generates a target block corresponding to the current transaction data.

S12016. The master node sends the target block to another consensus node, the another consensus node being a consensus node other than the master node in the target consensus nodes.

As shown in FIG. 14, when a target consensus node obtains transaction data, and determines that the target consensus node is a master node of a current block, the target consensus node generates a target block corresponding to the transaction data.

S12017. The master node broadcasts the target block to a non-consensus node in the blockchain for verification if a consensus performed by the another consensus node on the target block succeeds.

S12018. The master node obtains a previous block of the target block if a quantity of non-consensus nodes that succeed in verification on the target block meets a preset quantity requirement.

S12019. The master node stores the target block into the blockchain if a quantity of non-consensus nodes that succeed in verification on the previous block meets a preset quantity requirement.

S12020. If the quantity of non-consensus nodes that succeed in verification on the previous block does not meet the preset quantity requirement, the master node regenerates a target block based on transaction data of the previous block, and returns to step S12016.

For specific implement processes and corresponding beneficial effects in this embodiment of this application, refer to the foregoing node selection method embodiment. In this embodiment, details are not described herein again.

For better implementation of the node selection method in the embodiments of this application, the embodiments of this application further provide an apparatus based on the node selection method. Nouns have the same meanings as those in the node selection method. For specific implementation details, refer to descriptions in the method embodiments.

Figure 15:
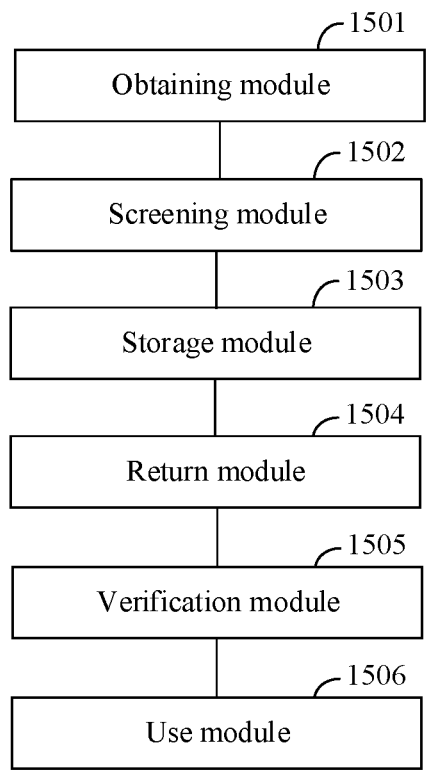
FIG. 15 is a schematic structural diagram of a node selection apparatus according to an embodiment of this application.

For example, as shown in FIG. 15, the node selection apparatus may include:
- an obtaining module 1501, configured to obtain attribute weights corresponding to nodes in a blockchain, and group the nodes in an order of the attribute weights, to obtain a plurality of node groups;
- a screening module 1502, configured to select a node group whose attribute weight meets a preset condition from the plurality of node groups, to obtain a target node group, and select a preset quantity of candidate consensus nodes from the target node group;
- a storage module 1503, configured to store a non-candidate consensus node in the target node group into an initial node group, the initial node group being a group other than the target node group in the plurality of node groups and matching the target node group;
- a return module 1504, configured to use the initial node group as a target node group, and return to the operation of selecting a candidate consensus node from the target node group, until all of the plurality of node groups are screened;
- a verification module 1505, configured to broadcast candidate consensus nodes to a second node in the nodes for verification; and
- a use module 1506, configured to use the candidate consensus nodes as target consensus nodes of the blockchain when verification success information for the candidate consensus nodes from the second node is received within a preset time period.

In the foregoing solution, the obtaining module 1501 is specifically configured to:
sort the nodes in an order of the attribute weights, to obtain a sorted queue; and
divide the sorted queue into a plurality of node groups.

In the foregoing solution, the storage module 1503 is specifically configured to:
select, from candidate node groups, a candidate node group that is adjacent to the target node group and whose attribute weight is less than that of the target node group, to obtain an initial node group matching the target node group, the candidate node group being a node group other than the target node group in the plurality of node groups: and
store the non-candidate consensus node in the target node group into the initial node group.

In the foregoing solution, the node group includes a first preset quantity of nodes. Correspondingly, the screening module 1502 is specifically configured to:
determine, based on the first preset quantity and the preset quantity, a random number corresponding to the target node group: and
select a preset quantity of candidate consensus nodes from the target node group based on the random number.

In the foregoing solution, the screening module 1502 is specifically configured to: use the preset quantity as a target quantity of random numbers corresponding to the target node group: and generate, within the first preset quantity, a target quantity of random numbers corresponding to the target node group.

In the foregoing solution, the screening module 1502 is specifically configured to: use the random number as a node sequence number in the target node group: and use a node corresponding to the node sequence number as a candidate consensus node corresponding to the target node group.

In the foregoing solution, the verification module 1505 is specifically configured to: calculate a Merkle_root of the candidate consensus nodes: and broadcast the Merkle_root to the second node in the nodes for verification.

In the foregoing solution, the obtaining module 1501 is specifically configured to: obtain a plurality of pieces of attribute information corresponding to each node in the blockchain: and determine, based on information weights corresponding to the attribute information, an attribute weight corresponding to the node.

In the foregoing solution, the obtaining module 1501 is specifically configured to: obtain the information weights corresponding to the attribute information, and obtain an adjustment coefficient corresponding to the information weights: adjust the information weights based on the adjustment coefficient, to obtain adjusted information weights: and determine, based on the adjusted information weights, the attribute weight corresponding to the node.

In the foregoing solution, the node selection apparatus further includes: a block storage module, configured to: obtain a target block, and perform a consensus on the target block by using the target consensus nodes: and store the target block into the blockchain when the consensus on the target block succeeds.

In the foregoing solution, the block storage module is specifically configured to: broadcast the target block to a non-consensus node in the blockchain for verification when the consensus on the target block succeeds: and store the target block into the blockchain when a quantity of non-consensus nodes that succeed in verification on the target block meets a preset quantity requirement.

In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units. Moreover, each module or unit can be part of an overall module or unit that includes the functionalities of the module or unit. During specific implementation, the modules may be implemented as independent entities, or may be combined arbitrarily into one or more entities for implementation. For specific implementations of the modules and corresponding beneficial effects, refer to the foregoing method embodiments. Details are not described herein again.

Figure 16:
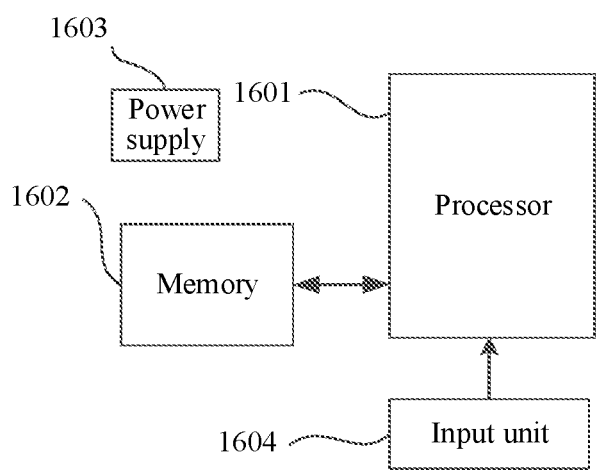
FIG. 16 is a schematic structural diagram of a first node according to an embodiment of this application.

An embodiment of this application further provides a first node. The first node may be a server, a terminal, or the like. FIG. 16 is a schematic structural diagram of a first node according to an embodiment of this application. Specifically:

The first node may include components such as a processor 1601 with one or more processing core, a memory 1602 with one or more computer-readable storage media, a power supply 1603, and an input unit 1604. A person skilled in the art may understand that the structure of the first node shown in FIG. 16 does not constitute a limitation on the first node, which may include more or fewer components than those shown in the figure, or have some components combined, or have a different component arrangement.

The processor 1601 is a control center of the first node, which is connected to various parts of the entire first node by using various interfaces and lines, and performs various functions and data processing of the first node by running or executing a computer program and/or module stored in the memory 1602 and invoking data stored in the memory 1602. In some embodiments, the processor 1601 may include one or more processor cores. In some embodiments, the processor 1601 may integrate an application processor and a modem. The application processor mainly processes an operating system, a user interface, an application program, and the like. The modem mainly processes wireless communication. It may be understood that the modem may alternatively not be integrated into the processor 1601.

The memory 1602 may be configured to store a computer program and module. The processor 1601 runs the computer program and module stored in the memory 1602, to perform various functional applications and data processing. The memory 1602 may mainly include a program storage area and a data storage area. The program storage area may store an operating system, a computer program required by at least one function (such as a sound playing function and an image playing function), and the like. The data storage area may store data created based on use of the first node, and the like. In addition, the memory 1602 may include a high-speed random access memory (RAM), and may further include a non-volatile memory, for example, at least one magnetic disk storage device, a flash memory, or another non-volatile solid-state storage device. Correspondingly, the memory 1602 may further include a memory controller, to provide access of the processor 1601 to the memory 1602.

The first node further includes the power supply 1603 for supplying power to the components. In some embodiments, the power supply 1603 may be logically connected to the processor 1601 by using a power management system, to implement functions such as charging, discharging, and power consumption management by using the power management system. The power supply 1603 may further include one or more of a direct current or alternating current power supply, a recharging system, a power failure detection circuit, a power converter or inverter, a power state indicator, and any other components.

The first node may further include the input unit 1604. The input unit 1604 may be configured to receive input digit or character information, and generate a key board, mouse, joystick, optical, or track ball signal input related to user setting and function control.

Although not shown, the first node may further include a display unit and the like, which are not further described herein. Specifically, in this embodiment of this application, the processor 1601 in the first node loads, into the memory 1602 according to the following instruction, an executable file corresponding to a process of one or more computer programs, and the processor 1601 runs the computer program stored in the memory 1602, to implement various functions, such as: obtaining attribute weights corresponding to nodes in a blockchain, and grouping the nodes in an order of the attribute weights, to obtain a plurality of node groups: selecting a node group whose attribute weight meets a preset condition from the plurality of node groups, to obtain a target node group, and selecting a preset quantity of candidate consensus nodes from the target node group: storing a non-candidate consensus node in the target node group into an initial node group, the initial node group being a group other than the target node group in the plurality of node groups and matching the target node group: using the initial node group as a target node group, and returning to the operation of selecting a candidate consensus node from the target node group, until all of the plurality of node groups are screened: broadcasting candidate consensus nodes to a second node in the nodes for verification: and using the candidate consensus nodes as target consensus nodes of the blockchain when verification success information for the candidate consensus nodes from the second node is received within a preset time period.

For specific implementations of the foregoing operations and corresponding beneficial effects, refer to the detailed descriptions of the node selection method above. Details are not described herein again.

A person of ordinary skill in the art may understand that, all or some steps in the methods of the foregoing embodiments may be completed by a computer program, or by a computer program controlling related hardware. The computer program may be stored in a computer-readable storage medium, and loaded and executed by a processor.

To this end, an embodiment of this application provides a computer-readable storage medium, storing a computer program. The computer program can be loaded by a processor to perform steps in the node selection method according to the embodiments of this application. For example, the computer program may perform the following steps:

obtaining attribute weights corresponding to nodes in a blockchain, and grouping the nodes in an order of the attribute weights, to obtain a plurality of node groups;

selecting a node group whose attribute weight meets a preset condition from the plurality of node groups, to obtain a target node group, and selecting a preset quantity of candidate consensus nodes from the target node group;

storing a non-candidate consensus node in the target node group into an initial node group, the initial node group being a group other than the target node group in the plurality of node groups and matching the target node group;

using the initial node group as a target node group, and returning to the operation of selecting a candidate consensus node from the target node group, until all of the plurality of node groups are screened;

broadcasting candidate consensus nodes to a second node in the nodes for verification; and using the candidate consensus nodes as target consensus nodes of the blockchain when verification success information for the candidate consensus nodes from the second node is received within a preset time period.

For specific implementations of the foregoing operations and corresponding beneficial effects, refer to the previous embodiments. Details are not described herein again.

The computer-readable storage medium may include a read-only memory (ROM), a RAM, a magnetic disk, an optical disc, or the like.

The computer program stored in the computer-readable storage medium can perform the steps in the node selection method according to the embodiments of this application, and therefore can achieve beneficial effects that can be achieved by the node selection method according to the embodiments of this application. For details, refer to the previous embodiments. Details are not described herein again.

In addition, a computer program product or a computer program is provided. The computer program product or the computer program includes a computer instruction, the computer instruction being stored in a computer-readable storage medium. A processor of a computer device reads the computer instruction from the computer-readable storage medium, and the processor executes the computer instruction, to cause the computer device to execute the node selection method.

The node selection method and apparatus, the first node, the storage medium, and the program product according to the embodiments of this application are described in detail above. Although the principles and implementations of this application are described by using specific examples in this specification, the foregoing descriptions of the embodiments are intended only to help understand the method and the core idea of this application. In addition, a person skilled in the art may make variations to the specific implementations and application range according to the idea of this application. In conclusion, the content of the specification is not to be construed as a limitation to this application.

What is claimed is:

1. A node selection method performed by a computer device acting as a first node in a blockchain, the method comprising:

obtaining a plurality of node groups by grouping nodes in the blockchain according to their corresponding attribute weights in an order of the attribute weights;

selecting, among the plurality of node groups, a node group whose attribute weight meets a preset condition as a target node group, and selecting a preset quantity of candidate consensus nodes from the target node group;

storing a non-candidate consensus node from the target node group into another node group among the plurality of node groups that matches the target node group;

repeating the selecting and storing operations using the another node group as a new target node group until all of the plurality of node groups are screened;

broadcasting the candidate consensus nodes to one or more second nodes in the blockchain for verification; and using a subset of the candidate consensus nodes as target consensus nodes of the blockchain when verification success information for the subset of the candidate consensus nodes from the second nodes is received within a preset time period.

2. The method according to claim 1, wherein the obtaining a plurality of node groups by grouping nodes in the blockchain according to their corresponding attribute weights in an order of the attribute weights comprises:

sorting the nodes in the blockchain in an order of their respective attribute weights, to obtain a sorted queue of the nodes in the blockchain; and dividing the sorted queue of the nodes in the blockchain into a plurality of node groups.

3. The method according to claim 2, wherein the storing a non-candidate consensus node in the target node group into another node group comprises:

selecting, from the plurality of node groups, a candidate node group that is adjacent to the target node group and whose attribute weight is less than that of the target node group as an initial node group matching the target node group; and storing the non-candidate consensus node from the target node group into the initial node group.

4. The method according to claim 1, wherein the target node group comprises a first preset quantity of nodes, and the selecting a preset quantity of candidate consensus nodes from the target node group comprises:
- determining, based on the first preset quantity of nodes and the preset quantity of candidate consensus nodes, a random number corresponding to the target node group; and
- selecting a preset quantity of candidate consensus nodes from the target node group based on the random number.

5. The method according to claim 1, wherein the broadcasting the candidate consensus nodes to one or more second nodes in the blockchain for verification comprises:
- calculating a Merkle root of the candidate consensus nodes; and
- broadcasting the Merkle root to the second nodes in the blockchain for verification.

6. The method according to claim 1, wherein the attribute weights corresponding to nodes in the blockchain are obtained by:
- obtaining a plurality of pieces of attribute information corresponding to each node in the blockchain; and
- determining, based on information weights corresponding to the attribute information, an attribute weight corresponding to the node.

7. The method according to claim 1, wherein the method further comprising:
- obtaining a target block, and performing a consensus on the target block by using the target consensus nodes; and
- storing the target block into the blockchain when the consensus on the target block succeeds.

8. The method according to claim 7, wherein the storing the target block into the blockchain when the consensus on the target block succeeds comprises:
- broadcasting the target block to a non-consensus node in the blockchain for verification when the consensus on the target block succeeds; and
- storing the target block into the blockchain when a quantity of non-consensus nodes that succeed in verification on the target block meets a preset quantity requirement.

9. A computer device acting as a first node in a blockchain, comprising a processor and a memory, the memory storing a computer program, and the processor being configured to execute the computer program in the memory and cause the first node to perform a node selection method including:
- obtaining a plurality of node groups by grouping nodes in the blockchain according to their corresponding attribute weights in an order of the attribute weights;
- selecting, among the plurality of node groups, a node group whose attribute weight meets a preset condition as a target node group, and selecting a preset quantity of candidate consensus nodes from the target node group;
- storing a non-candidate consensus node from the target node group into another node group among the plurality of node groups that matches the target node group;
- repeating the selecting and storing operations using the another node group as a new target node group until all of the plurality of node groups are screened;
- broadcasting the candidate consensus nodes to one or more second nodes in the blockchain for verification; and
- using a subset of the candidate consensus nodes as target consensus nodes of the blockchain when verification success information for the subset of the candidate consensus nodes from the second nodes is received within a preset time period.

10. The computer device according to claim 9, wherein the obtaining a plurality of node groups by grouping nodes in the blockchain according to their corresponding attribute weights in an order of the attribute weights comprises:
- sorting the nodes in the blockchain in an order of their respective attribute weights, to obtain a sorted queue of the nodes in the blockchain; and
- dividing the sorted queue of the nodes in the blockchain into a plurality of node groups.

11. The computer device according to claim 10, wherein the storing a non-candidate consensus node in the target node group into another node group comprises:
- selecting, from the plurality of node groups, a candidate node group that is adjacent to the target node group and whose attribute weight is less than that of the target node group as an initial node group matching the target node group; and
- storing the non-candidate consensus node from the target node group into the initial node group.

12. The computer device according to claim 9, wherein the target node group comprises a first preset quantity of nodes, and the selecting a preset quantity of candidate consensus nodes from the target node group comprises:
- determining, based on the first preset quantity of nodes and the preset quantity of candidate consensus nodes, a random number corresponding to the target node group; and
- selecting a preset quantity of candidate consensus nodes from the target node group based on the random number.

13. The computer device according to claim 9, wherein the broadcasting the candidate consensus nodes to one or more second nodes in the blockchain for verification comprises:
- calculating a Merkle root of the candidate consensus nodes; and
- broadcasting the Merkle root to the second nodes in the blockchain for verification.

14. The computer device according to claim 9, wherein the attribute weights corresponding to nodes in the blockchain are obtained by:
- obtaining a plurality of pieces of attribute information corresponding to each node in the blockchain; and
- determining, based on information weights corresponding to the attribute information, an attribute weight corresponding to the node.

15. The computer device according to claim 9, wherein the method further comprising:
- obtaining a target block, and performing a consensus on the target block by using the target consensus nodes; and
- storing the target block into the blockchain when the consensus on the target block succeeds.

16. The computer device according to claim 15, wherein the storing the target block into the blockchain when the consensus on the target block succeeds comprises:
- broadcasting the target block to a non-consensus node in the blockchain for verification when the consensus on the target block succeeds; and storing the target block into the blockchain when a quantity of non-consensus nodes that succeed in verification on the target block meets a preset quantity requirement.

17. A non-transitory computer-readable storage medium, storing a computer program that, when executed by a processor of a computer device acting as a first node in a blockchain, causes the computer device to perform a node selection method including:
  obtaining a plurality of node groups by grouping nodes in the blockchain according to their corresponding attribute weights in an order of the attribute weights;
  selecting, among the plurality of node groups, a node group whose attribute weight meets a preset condition as a target node group, and selecting a preset quantity of candidate consensus nodes from the target node group;
  storing a non-candidate consensus node from the target node group into another node group among the plurality of node groups that matches the target node group;
  repeating the selecting and storing operations using the another node group as a new target node group until all of the plurality of node groups are screened;
  broadcasting the candidate consensus nodes to one or more second nodes in the blockchain for verification; and
  using a subset of the candidate consensus nodes as target consensus nodes of the blockchain when verification success information for the subset of the candidate consensus nodes from the second nodes is received within a preset time period.

18. The non-transitory computer-readable storage medium according to claim 17, wherein the obtaining a plurality of node groups by grouping nodes in the blockchain according to their corresponding attribute weights in an order of the attribute weights comprises:
  sorting the nodes in the blockchain in an order of their respective attribute weights, to obtain a sorted queue of the nodes in the blockchain; and
  dividing the sorted queue of the nodes in the blockchain into a plurality of node groups.

19. The non-transitory computer-readable storage medium according to claim 17, wherein the target node group comprises a first preset quantity of nodes, and the selecting a preset quantity of candidate consensus nodes from the target node group comprises:
  determining, based on the first preset quantity of nodes and the preset quantity of candidate consensus nodes, a random number corresponding to the target node group; and
  selecting a preset quantity of candidate consensus nodes from the target node group based on the random number.

20. The non-transitory computer-readable storage medium according to claim 17, wherein the method further comprising:
  obtaining a target block, and performing a consensus on the target block by using the target consensus nodes; and
  storing the target block into the blockchain when the consensus on the target block succeeds.

\* \* \* \* \*